US007073175B2

(12) United States Patent
Rehg et al.

(10) Patent No.: US 7,073,175 B2
(45) Date of Patent: Jul. 4, 2006

(54) ON-LINE SCHEDULING OF CONSTRAINED DYNAMIC APPLICATIONS FOR PARALLEL TARGETS

(75) Inventors: James M. Rehg, Arlington, MA (US); Kathleen Knobe, Lexington, MA (US)

(73) Assignee: Hewlett-Packard Development Company, Inc., Houston, TX (US)

( * ) Notice: Subject to any disclaimer, the term of this patent is extended or adjusted under 35 U.S.C. 154(b) by 0 days.

(21) Appl. No.: 11/145,325

(22) Filed: Jun. 3, 2005

(65) Prior Publication Data

US 2005/0223379 A1   Oct. 6, 2005

Related U.S. Application Data

(63) Continuation of application No. 09/574,866, filed on May 19, 2000.

(51) Int. Cl.
| G06F 9/46 | (2006.01) |
| G06F 7/38 | (2006.01) |
| G06F 15/16 | (2006.01) |
| G06F 15/00 | (2006.01) |
| G06F 12/00 | (2006.01) |
| G06G 7/48 | (2006.01) |
| G06F 9/44 | (2006.01) |
| G06F 9/45 | (2006.01) |

(52) U.S. Cl. ............... 718/102; 708/446; 709/229; 703/6; 712/28; 711/119; 711/149
(58) Field of Classification Search ........ 718/100–108; 712/23, 208, 215, 28; 716/1, 2, 7, 18; 700/31, 700/101; 708/446; 703/6; 709/229; 711/119, 711/149; 717/108–161
See application file for complete search history.

(56) References Cited

U.S. PATENT DOCUMENTS

| 3,614,745 | A |   | 10/1971 | Podvin et al. |
| 4,607,325 | A | * | 8/1986 | Horn ........................ 700/31 |
| 4,843,541 | A |   | 6/1989 | Bean et al. |
| 4,885,684 | A | * | 12/1989 | Austin et al. ............... 717/149 |
| 4,965,718 | A |   | 10/1990 | George et al. |
| 4,972,314 | A | * | 11/1990 | Getzinger et al. .......... 711/149 |
| 5,099,322 | A |   | 3/1992 | Gove |
| 5,164,992 | A |   | 11/1992 | Turk et al. |
| 5,205,993 | A |   | 4/1993 | Leib et al. |
| 5,247,677 | A | * | 9/1993 | Welland et al. ............ 718/103 |
| 5,257,372 | A |   | 10/1993 | Furtney et al. |

(Continued)

OTHER PUBLICATIONS

Carter et al., "Generational Scheduling for Dynamic Task Management in Herterogeneous Computing System", 1998, Elsevier Science Inc., pp. 219-236.*

(Continued)

*Primary Examiner*—Meng-Ai An
*Assistant Examiner*—Jennifer N. To
(74) *Attorney, Agent, or Firm*—Richard P. Lange

(57) ABSTRACT

A static schedule is selected from a set of static schedules for an application dependent on the state of the application. A scheduling system stores a set of pre-defined static schedules for each state of the application. A scheduling system learns the costs of predefined schedules for each state of the application on-line as the application executes. Upon the detection of a state change in the application during runtime, the scheduling system selects a new static schedule for the application. The new static schedule is determined based on schedule costs and exploration criteria.

20 Claims, 14 Drawing Sheets

U.S. PATENT DOCUMENTS

| | | | |
|---|---|---|---|
| 5,291,599 | A | 3/1994 | Cohen et al. |
| 5,367,687 | A | 11/1994 | Tarsy et al. |
| 5,392,429 | A * | 2/1995 | Agrawal et al. ............ 708/446 |
| 5,511,153 | A | 4/1996 | Azarbayejani et al. |
| 5,563,988 | A | 10/1996 | Maes et al. |
| 5,573,013 | A * | 11/1996 | Conlan ........................ 600/595 |
| 5,606,698 | A * | 2/1997 | Powell ........................ 717/161 |
| 5,619,502 | A | 4/1997 | Kahn et al. |
| 5,664,164 | A | 9/1997 | Riddle |
| 5,691,902 | A | 11/1997 | Taniguchi et al. |
| 5,712,976 | A | 1/1998 | Falcon, Jr. et al. |
| 5,713,039 | A | 1/1998 | Tran |
| 5,742,821 | A * | 4/1998 | Prasanna ..................... 718/102 |
| 5,757,648 | A | 5/1998 | Nakamura |
| 5,768,594 | A * | 6/1998 | Blelloch et al. ............ 717/149 |
| 5,781,787 | A * | 7/1998 | Shafer et al. ................. 712/28 |
| 5,802,580 | A | 9/1998 | McAlpine |
| 5,809,161 | A | 9/1998 | Auty et al. |
| 5,809,321 | A | 9/1998 | Hansen et al. |
| 5,819,021 | A | 10/1998 | Stanfill et al. |
| 5,826,080 | A * | 10/1998 | Dworzecki .................. 718/103 |
| 5,826,095 | A | 10/1998 | Jordan |
| 5,852,449 | A | 12/1998 | Esslinger et al. |
| 5,860,095 | A * | 1/1999 | Iacobovici et al. ......... 711/119 |
| 5,884,060 | A * | 3/1999 | Vegesna et al. ............. 712/215 |
| 5,886,995 | A | 3/1999 | Arsenault et al. |
| 5,887,143 | A * | 3/1999 | Saito et al. ................. 709/248 |
| 5,923,890 | A | 7/1999 | Kubala et al. |
| 5,937,084 | A * | 8/1999 | Crabtree et al. ............ 382/137 |
| 5,953,524 | A * | 9/1999 | Meng et al. ................. 717/108 |
| 5,991,804 | A | 11/1999 | Bolosky et al. |
| 6,088,678 | A * | 7/2000 | Shannon ........................ 705/8 |
| 6,178,542 | B1 * | 1/2001 | Dave ........................... 716/18 |
| 6,201,999 | B1 | 3/2001 | Jevtic |
| 6,230,303 | B1 * | 5/2001 | Dave .............................. 716/7 |
| 6,289,488 | B1 * | 9/2001 | Dave et al. .................... 716/1 |
| 6,330,609 | B1 * | 12/2001 | Garofalakis et al. ........ 709/229 |
| 6,421,809 | B1 * | 7/2002 | Wuytack et al. ............... 716/2 |
| 6,519,498 | B1 * | 2/2003 | Jevtic et al. ................. 700/101 |
| 6,779,183 | B1 * | 8/2004 | Chekuri et al. ............. 718/105 |
| 6,889,178 | B1 * | 5/2005 | Chacon .......................... 703/6 |
| 2001/0032109 | A1 * | 10/2001 | Gonyea et al. ................ 705/8 |
| 2001/0042189 | A1 * | 11/2001 | Babaian et al. ............... 712/23 |
| 2002/0056035 | A1 * | 5/2002 | Rozenshein et al. ........ 712/208 |

OTHER PUBLICATIONS

Prasanna et al., "Generalized Multiprocessor Scheduling for Directed Acylic Graphs", 1994, IEEE, pp. 237-246.*
Prasanna et al., "Generalised Multiprocessor Scheduling Using Optimal Control", 1991, AMC, pp. 216-228.*
Atkeson, C.G., et al., "Locally Weighted Learning," *Artificial Intelligence Review*, 11:11-73, 1997.
Atkeson, C.G., et al., "Locally Weighted Learning for Control," *Artificial Intelligence Review*, 11:75-1133, 1997.
Bal, H.E. and Haines, M., "Approaches for Integrating Task and Data Parallelism," *IEEE Concurrency*, 1998. To appear.
Boyan, J.A. and Littman, M.L., "Packet Routing in Dynamically Changing Networks: A Reinforcement Learning Approach," In J.D. Cowan, G. Tesauro, and J. Alspector, editors, *Advances in Neural Information Processing Systems 6 (NIPS)*. Morgan Kaufman, 1994.
Chakrabarti, S., et al., "Models and Scheduling Algorithms for Mixed Data and Task Parallel Programs," *J. of Parallel and Distributed Computing*, 47:168-184, 1997.
Darrell, T., et al., "Active Face Tracking and Pose Estimation in an Interactive Room," 1063-6919/96, 1996 IEEE, (pp. 67-72).
Fujimoto, R.M., "The Virtual Time Machine," Univ. of Utah, Symp. on Parallel Algorithms and Architecture, 1989.
Ghosh, K., et al., "Parallel Discrete Event Simulation Using Space-Time Memory," *International Conference on Parallel Processing*, 1991.
Jefferson, D.R., "Virtual Time," Univ. of So. Calif., *ACM Transactions on Programming Languages and Systems*, vol. 7, No. 3, Jul. 1985, pp. 404-425.
Jordan, M.I. and Rumelhart, D.E., "Forward Models: Supervised Learning with a Distal Teacher," *Cognitive Science*, 16:307-354, 1992.
Schaal, S. and Atkeson, C.G., "Assessing the Quality of Local Linear Models," In J.D. Cowan, G. Tesauro, and J. Alspector, editors, *Advances in Neural Information Processing Systems 6 (NIPS)*, pp. 160-167. Morgan Kaufman, 1994.
Singla, A., et al., "Temporal Notions of Synchronization and Consistency in Beehive," Georgia Inst. of Tech., *SPAA '97*, Newport, R.I. . . .
Subholk, J., et al., "Communication and Memory Requirements as the Basis for Mapping Task and Data Parallel Programs," *Proc. Supercomputing '94*, Nov. 1994.f.
Takeuchi, A., et al., "Situated Facial Displays: Towards Social Interaction," *CHI Mosaic of Creativity*, Denver, CO, pp. 450-455, May 1995.
Verghese, B., et al., "Operating System Support for Improving Data Locality on CC-NUMA Compute Servers," In *Proc. Seventh Intl. Conf. on Architectural Support for Programming Languages and Operating Systems*, pp. 279-289, Oct. 1986.
Wren, C.R., et al., "Pfinder: Real-Time Tracking of the Human Body," *IEEE Transactions on Pattern Analysis and Machine Intelligence*, 19(7) : pp. 780-785 (Jul. 1997).
Wren, C.R., et al., "Pfinder: Real-Time Tracking of the Human Body," *SPIE* 1995, vol. 2615, pp. 89-98.
Puschner, et al., "Calculating the Maximum Execution Time of Real-Time Programs," Digital Equipment Corporation, Apr. 7, 1989.
Jeffay, et al., "On Non-Preemptive Scheduling of Period and Sporadic Tasks," Proceedings, Twelfth, vol., Iss. 4-6, Dec. 1991.
Lee, et al., "Static Scheduling of Synchronous Data Flow Programs for Digital Signal Processing," vol. C-36, No. J, Jan. 1987, IEE.
Kwok, et al., "Dynamic Critical-Path Scheduling: An Effective Technique for Allocating Task Graphs to Multiprocessor," vol. 7, Iss. 5, May 1996, *IEEE*.
Parhi, et al., "Static Rate-Optimal Scheduling of Iterative Data-Flow Programs Via Optimum Unfolding," vol. 40, Iss. 2, Feb. 1991, *IEEE*.
Lehoczky, et al., "An Optimal for Scheduling Soft-Aperiodic Tasks in Fixed-Priority Preemptive Systems," Real-Time Systems Symposium, vol. Iss. 2-4, Dec. 1992.
Kasahara, et al., "Parallel Processing of Near Fine Grain Tasks Using Static Scheduling on OSCAR," Supercomputing '90, Proceedings of, vol., Iss. 12-16, Nov. 1990.
Hong, et al., "On-Line Scheduling of Real-Time Tasks," Real-Time Systems Symposium, Proceedings, vol., Iss. 6-8, Dec. 1988.
Hou, et al., "Allocation of Periodic Task Modules with Precedence and Deadline Constraints in Distributed Real-Time Systems," Real-Time Systems Symposium, vol., Iss. 2-4, Dec. 1992.

Ramos-Thuel, et al., "On-Line Scheduling of Hard Deadline Aperiodic Tasks in Fixed-Priority Systems," Real-Time Systems Symposium, Proceedings, vol., Iss. 1-3, Dec. 1993, pp. 160-171.

Davis, et al., "Optimal Priority Assignment for Aperiodic Tasks with Firm Deadlines in Fixed Priority Pre-emptive Systems," Information Processing Letters, vol. 53, No. 5, Mar. 1995, pp. 249-254.

Prassana, S., "Compilation of Parallel Multimedia Computations—Extended Retiming Theory and Amdahl's Law," *Sixth ACM SIGPLAN Symposium on Principles and Practice of Parallel Programming*, Jun. 1997.

Nieh, J. and S.M. Lam, "The design, implementation and evaluation of SMART: A scheduler for multimedia applications," *Proceedings of the Sixteenth ACM Symposium on Operating Systems Principles (SOSP)*, 1997.

Yau, D.K.Y. and S.S. Lam, "Adaptive rate-controlled scheduling for multimedia applications," *ACM Multimedia 96*, 1996.

\* cited by examiner

ON-LINE SCHEDULING OF CONSTRAINED DYNAMIC APPLICATIONS FOR PARALLEL TARGETS

RELATED APPLICATION

This application is a continuation of U.S. application Ser. No. 09/574,866, filed May 19, 2000. The entire teachings of the above application are incorporated herein by reference.

BACKGROUND OF THE INVENTION

The performance of applications, such as real-time interactive multimedia applications, is dependent on task scheduling. Scheduling tasks in a real-time interactive multimedia application is difficult because of the requirement for integration of task and data parallelism for effective computation. Task and data parallelism are distinct programming models for describing parallel applications.

A task parallel application is typically composed of a set of cooperating processes which are implemented in a framework such as POSIX threads. The programmer explicitly specifies communication and synchronization between threads in the application. The run-time system then schedules the execution of the threads on the processor. In contrast, a data-parallel application is usually a single program which executes on multiple processors and operates on distributed data.

Tasks in an application may be scheduled using one of three prior art classes of scheduling algorithms for parallel systems. The first class is off-line schedulers for an application. An off-line scheduler for an application is described in "Compilation of Parallel Multimedia Computations—Extending Retiming Theory and Amdahl's law" by Prasanna, Proc. Symposium on Principles and Practice of Parallel Programming (PPOPP), 1997. This off-line scheduler performs extensive analysis to optimize a single static schedule for an application. Some applications are dynamic in the sense that the relative execution times for the tasks vary over time. Dynamic applications are not efficiently executed by a single static schedule.

The second class is on-line schedulers for a mix of applications. This class includes systems such as described in "The Design, Implementation and Evaluation of Smart: A Scheduler for Multimedia Applications" by Nieh et al., Proceedings of the Sixteenth ACM Symposium on Operating System Principles (SOSP), 1997 and "Adaptive Rate-Controlled Scheduling for Multimedia Applications" by Yau et al., Proc. 8th Symposium on Parallel Algorithms and Architecture (SPAA), June 1996. These systems are very general and do not involve detailed analysis of the applications to be scheduled.

The third class of scheduling is the real-time scheduling algorithms used, for example, in commercial real-time operating systems such as VxWorks. These algorithms schedule tasks such that each operation completes within a bounded amount of time and is described in "Scheduling Algorithms" by Bruker, Springer-Verlang, 1995 and "Scheduling: Theory, Algorithms, and Systems" by Pinedo, Prentice Hall, 1995.

SUMMARY OF THE INVENTION

We present an on-line system in which the cost of a set of static schedules is learned, based on the performance of the application. The static schedule currently with the lowest cost for each of the distinct scheduling states is designated as the optimal schedule for that state.

The cost of the set of static schedules can be learned each time there is a change in the scheduling state. Alternatively, the cost can be learned continuously during runtime.

In one embodiment, a set of all possible schedules is associated with each schedule state. With each change in the scheduling state, the optimal schedule associated with that state is selected.

The process of selecting a schedule can select the schedule with the lowest cost. Alternatively, it can select a schedule whose cost is unknown. The selection process can be randomized, based on the utility of exploration.

In another embodiment, the cost of executing each task in the application is maintained for each scheduling state. With each change in the scheduling state, the optimal static schedule associated with a new scheduling state is computed using the stored task costs.

Once a particular schedule has been executed, the task costs associated with that scheduling state may be computed and stored.

The cost of either an entire schedule or an individual task may be updated using a sliding window which discounts older execution results at the expense of more recent execution results.

In yet another embodiment the cost of an individual task is used to predict the cost of a schedule. The predicted cost is used to select a schedule for exploration. Learning may be performed by storing input data during an active period in the application and exploring optimal schedules while replaying the stored input data during an idle period in the application. In another embodiment, learning may be performed by concurrently executing a copy of an application with identical input data on a processor other than the processor on which the application is executing. A change in the optimized schedules is immediately reflected to the on-line schedule for use in the next schedule change of the application.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
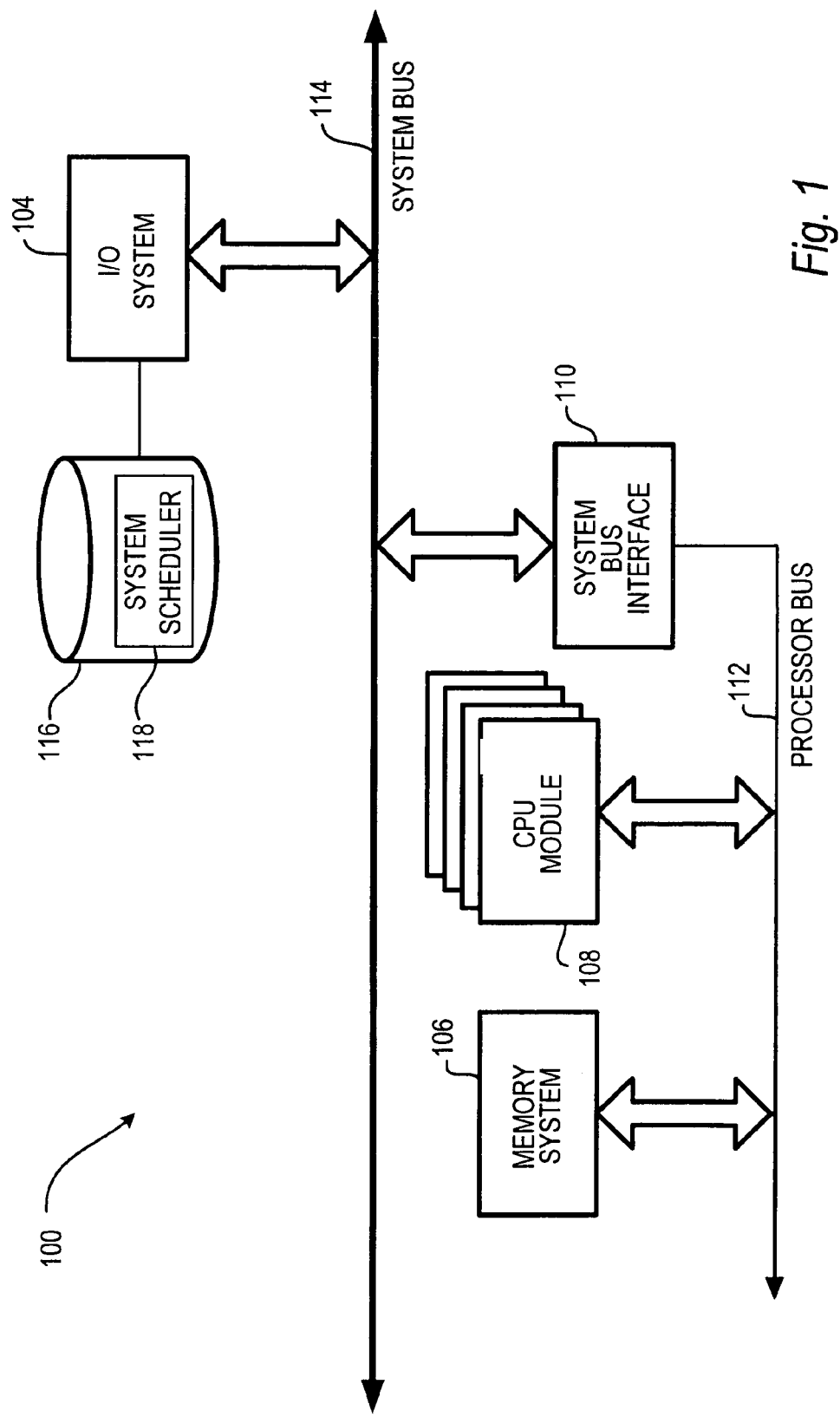
FIG. 1 is a block diagram of a computer system in which the present invention is used.

FIG. 1 is a block diagram of a computer system 100 in which the present invention is used. Included in the computer system 100 are at least one Central Processing Unit ("CPU") module 108, a memory system 106 and a system bus interface 110 connected by a processor bus 112. The CPU module 108 includes a processor (not shown). The system bus interface 110 is further connected to an Input/Output ("I/O") system 104 by a system bus 114. An external storage device 116 is connected to the I/O system 104. A scheduling system 118 according to the principles of the present invention is stored in the storage device 116 and also stored in the memory system 106. The scheduling system 118 schedules constrained dynamic applications programs stored in the memory system 106. One example of a constrained dynamic application which can be scheduled by the scheduling system 118 is a color tracker application.

Figure 2:
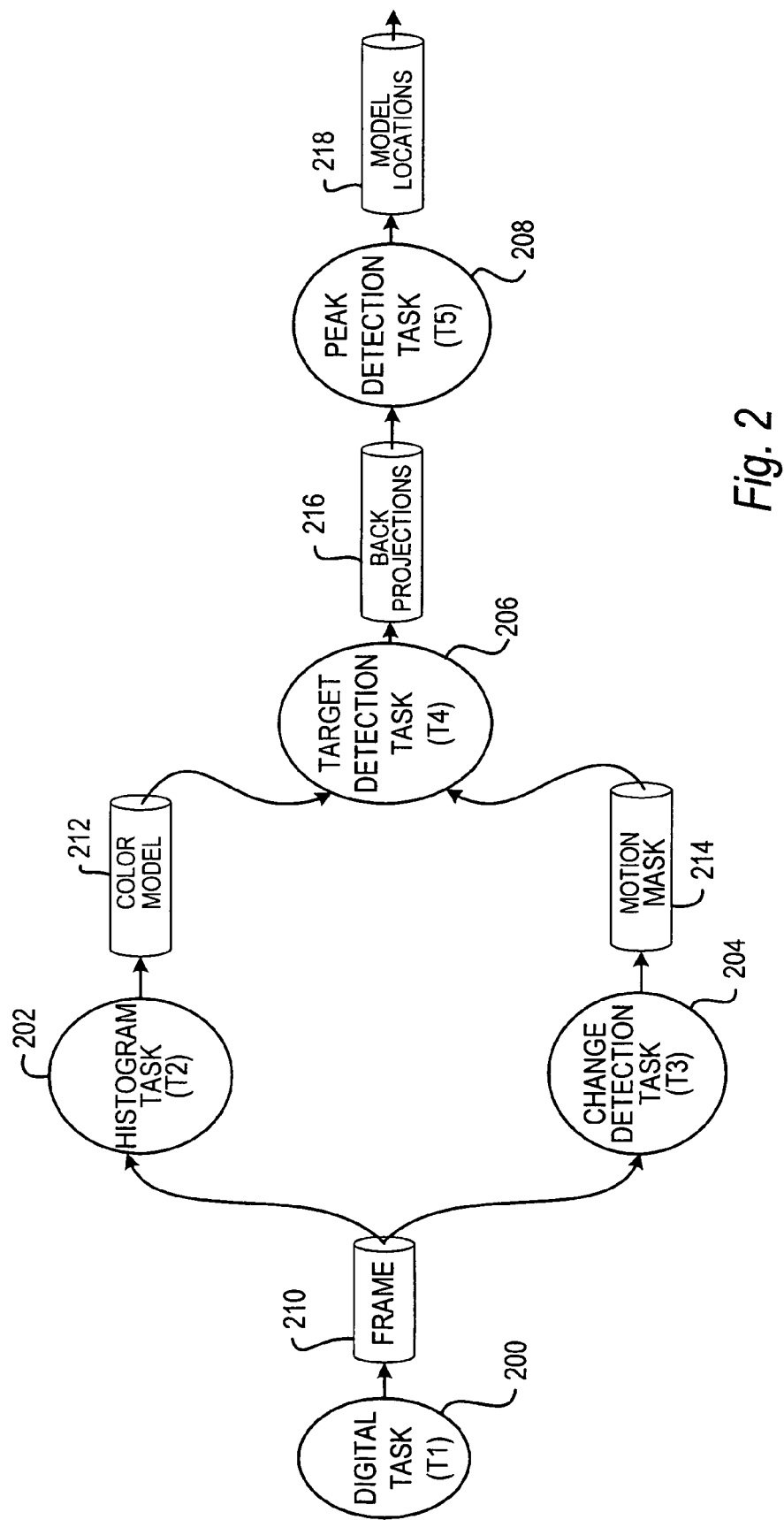
FIG. 2 is a task graph for a color tracker used for determining pre-defined static schedules stored in the scheduling system.

FIG. 2 is a task graph for the color tracker application used for determining pre-defined static schedules stored in the scheduling system 118 (FIG. 1). The color tracker application tracks identified models (individuals) standing in front of a camera based on their motion and clothing color. The camera is connected to the computer system 100 through the I/O system 104 shown in FIG. 1. The color tracker application is a constrained dynamic application because it has a small number of scheduling states. The number of scheduling states for the color tracker application are dependent on the number of identified individuals tracked and the number of processors in the computer system 100. For example, in a computer system including four processors and tracking zero to four individuals, there are twenty scheduling states.

The color tracker application includes five separate tasks: a digitizer task (T1) 200, a histogram task (T2) 202, a change detection task (T3) 204, a target detection task (T4) 206 and a peak detection task (T5) 208. A task number (T1–T5) is assigned to each of the tasks as shown in FIG. 2. The color tracker's tasks 200, 202, 204, 206, 208 are scheduled by the scheduling system 118 (FIG. 1). In a multithreaded computer system the tasks may be scheduled as separate threads.

The digitizer task (T1) 200 generates video frames 210. The histogram task (T2) 202 and the change detection task (T3) 204 perform preprocessing on the video frames 210. The histogram task (T2) 202 generates color models 212 for the video frame 210. The change detection task (T3) 204 generates a motion mask 214 for the video frame 210. The target detection task (T4) 206 compares previously acquired color models for each identified individual against the color models 212 using the motion mask 214 to eliminate background regions in the video frame 210 from consideration.

The target detection task (T4) 206 generates a set of back projection images 216, one for each identified individual, in which each pixel location has been labeled with the likelihood that it came from the identified individual. The peak detection task (T5) 208 analyzes each of the back projection images 216 separately to identify blobs of high likelihood for each identified individual. The centroids of these blobs give the locations of the identified individuals in the video frame 210.

The dependancies for each of the tasks 200, 202, 204, 206, 208 can be determined from the task graph. The histogram task (T2) 202 and the change detection task (T3) 204 operate in parallel on a video frame 210. Hence, task parallelism may be implemented by scheduling the change detection task (T3) and the histogram task (T2) concurrently on different processors.

The target detection task (T4) 206 operates on the color models 212 and motion mask 214 and thus must wait until processing for a video frame 210 is completed by both the histogram task (T2) 202 and the change detection task (T3) 204. Multiple target detection tasks (T4) 204 may be scheduled in parallel on separate processors with each of the target detection tasks (T4) 204 operating on a subset of the color models 212 and a portion of the motion mask 214.

The peak detection task (T5) 208 is dependent on the back projections 216 generated by the target detection task (T4) 206 and thus must be scheduled after the completion of the target detection task (T4) 206. The histogram task (T2) 202 and the change detection task (T3) 204 for a subsequent video frame can also be scheduled after the completion of the target detection task (T4) 206 in parallel with the peak detection task (T5) 218 for a current video frame 210.

Having determined the task or thread dependencies from the task graph for the color tracker, the set of all legal schedules for the color tracker can be generated.

The class of applications addressed by this technique are those expressible by a task graph such as that shown in FIG. 2. The distinct tasks communicate by streams of data called channels. A single input to the task graph is processed by the distinct tasks until it completes. This processing involves reading related information from input channels and writing results on output channels. The processing of a single input through the task graph is called an iteration. The application processes a relatively long sequence of single inputs. For some media applications the input may be viewed as essentially infinite. However, there are also scientific, commercial and some media applications that have all the characteristics of this class but are of bounded length. As long as the length of the input stream is high relative to the cost of a single iteration, the approach is efficient.

A key characteristic of the class of applications is that they exhibit constrained dynamism. The task graph is fixed but the ideal schedule depends on the scheduling variables. In particular in the color tracker application, the time to compute the digitizer task (T1) 200, the histogram task (T2) 202 and the change detection task (T3) 204 are independent of the number of individuals in front of the kiosk. However the time for both the target detector task (T4) 206 and the peak detector task (T5) 208 are linear in the number of individuals, but with very different constants. The number of individuals is an example of an application variable that is part of the scheduling state. When the number of individuals in front of the camera changes, the relative costs change, and therefore the ideal schedule changes. Not all scheduling variables are visible at the application level. A scheduling variable may indicate some dynamic aspect of the underlying system. Therefore, the class of applications addressed by this technique includes not only applications that are themselves dynamic, but also those that operate in a dynamically changing environment.

Figure 3:
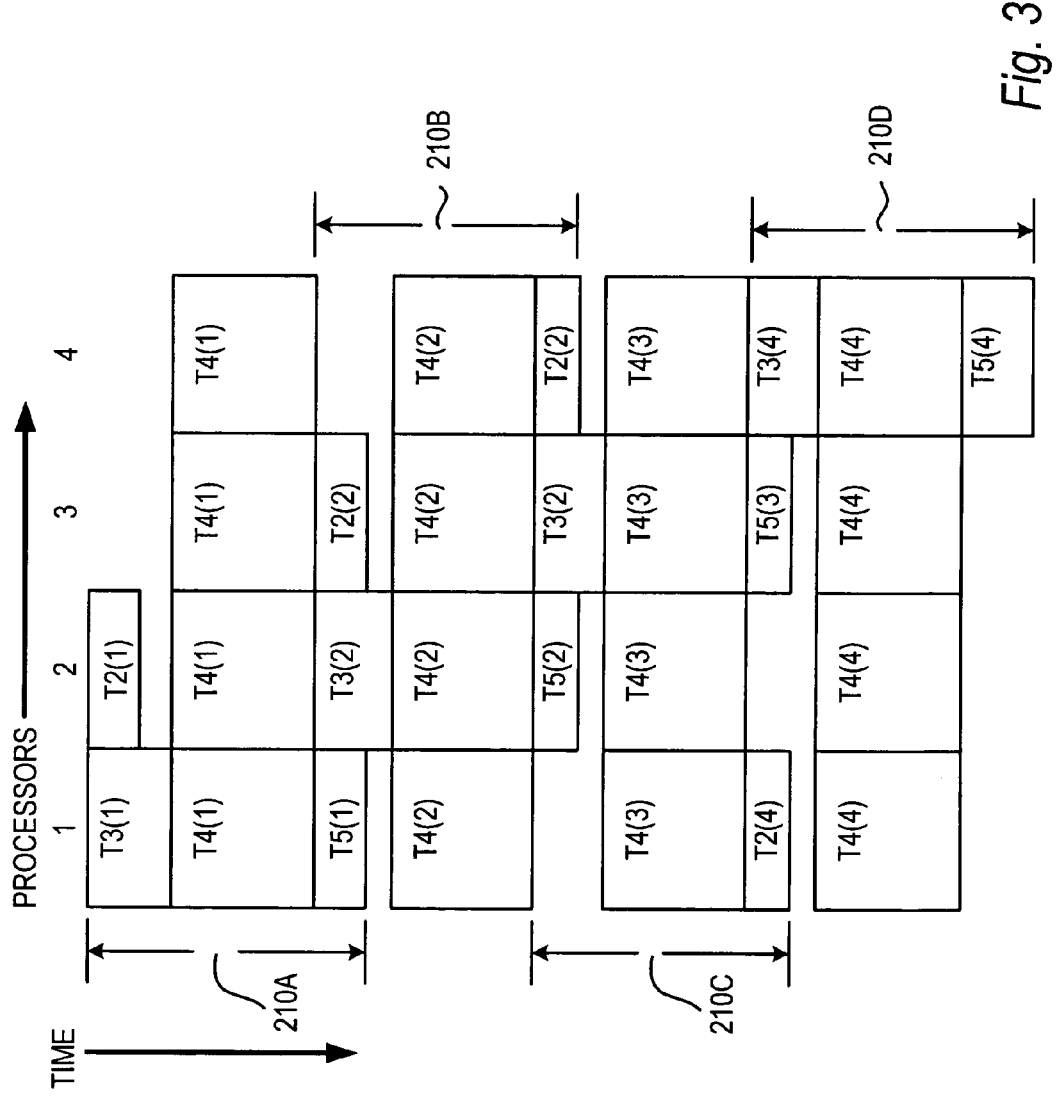
FIG. 3 is a schedule for one of the scheduling states for the color tracker.

FIG. 3 is a schedule for one of the scheduling states for the color tracker.

A schedule is defined as an assignment of tasks (and data parallel chunks of tasks) to processors, together with the dependencies among them specifying a partial ordering. In some situations the partial order can be augmented with timing information that specifies how long each task will take to execute. In these cases the schedule can describe the starting and ending times of individual tasks, as well as their partial order. The tilings illustrated in FIG. 3 are an example of such a detailed schedule. However, the exact timings of tasks on a parallel system may not be reproducible and in a learning context they may be known with varying degrees of accuracy. Thus, the optimal schedule is the partial ordering of tasks whose expected cost is lowest among the set of all partial orders.

Scheduling variables are defined as the set of variables that effect the choice of optimal schedule. Such variables may arise from a wide range of categories, for example, the application, characteristics of the system on which the application is currently executing, or the current goals. An example of an application scheduling variable in the color tracker application is the number of individuals in front of the kiosk. Examples of possible system scheduling variables include the number of processors on the system and the current load. The first of these system variables describes a static characteristic of the system. The second describes a dynamic characteristic (a continuously varying quantity).

There is one additional complication with regard to scheduling variables. As presented, each scheduling variable has a bounded number of values, for example, the number of individuals tracked and the number of processors available are bounded. However, it is often the case that a variable whose values are unbounded can legitimately be modeled as a variable with a bounded set of values by, for example, specifying a bounded number of ranges.

The system schedule attribute may also be an unbounded discrete quantity. A bounded discrete quantity is determined by dividing the unbounded discrete quantity into a set of intervals. For example, a surveillance system may use a set of cameras with overlapping fields of view to track people or vehicles moving in a large area such as university campus or a highway interchange. A multiprocessor system processes the video produced by these cameras and detects and tracks the targets (individuals or vehicles) in the video sequences. The scheduling algorithm in this case depends upon the number of targets that needed to be tracked.

While there is undoubtedly a physical limit to the number of targets that can be imaged by a set of cameras, this number is very difficult to compute or even predict in practice. So this number can be considered to be unbounded. For scheduling it is not necessary to have a separate policy for each unique number of targets. Rather it is more effective and convenient to break the number of targets up into ranges, for example, the ranges 0, 1–10, 11–50, and 51+. In short, any variable that may alter the choice of optimal schedule is considered a scheduling variable.

The current scheduling state is defined as the set of the current values of all the scheduling variables. Each scheduling state is mapped to a single schedule. A given schedule may be associated with multiple scheduling states.

The schedule shown in FIG. 3 is for the scheduling state in which the number of processors in the computer is four and the number of identified individuals in front of the camera is eight. The schedule processes four sequential video frames 210A–D through the color tracker application and is repeated for subsequent sets of four video frames 210.

The latency for a time stamp is defined as the time taken to process an iteration with that time-stamp. In the color tracker, the processing of one iteration corresponds to one of the video frames 210A–D. The sequence number of the video frame 210A–D being processed by a task is shown in the schedule enclosed by brackets, for example, tasks for the first video frame 210A are indicated by "(1)" after the task number. The processing of the first video frame 210A in the color tracker is described in conjunction with the task graph in FIG. 2.

Task parallelism is implemented by scheduling the change detection task (T3) 204 and the histogram task (T2) 202 concurrently on different processors. After processing for the first video frame 210A is completed by the histogram task (T2) 202 and the change detection task (T3) 204, data parallelism is implemented for the target detection task (T4) 206 by scheduling it in parallel on each of the four processors. Each of the target detection tasks (T4) 206 operates on a subset of the color models 212 and a portion of the motion mask 214.

The peak detection task (T5) 208 is scheduled after the completion of the target detection tasks (T4) 206. The histogram task (T2) 202 and change detection task (T3) 204 for the second video frame 210B and the peak detection task (T5) 208 for the first video frame 210A are all scheduled concurrently on different processors.

The static schedule includes some idle time. For example, there is idle time on the second processor between the color model task (T2) 402 and the target detection task (T4) 406. The performance of the color tracker may be increased, without affecting the minimal latency, by scheduling background tasks during this idle time. For example, the color tracker application tracks individuals already identified. A background task identifies new individuals as they move in front of the camera. The background task may be suspended and resumed to fit into the available idle time slots so that it does not extend the minimal latency schedule for the color tracker application.

The schedule shown is a static schedule for one scheduling state of the color tracker (four processors and eight identified individuals). Upon detection of a state change by the schedule switcher 206 (FIG. 2), for example, if the number of identified individuals decreases or one of the processors is no longer available, the current schedule may no longer be the optimal schedule. With a reduced number of processors on which to schedule the target detection task (T4) 406 the scheduling state is changed. The associated optimal schedule may also change. With a reduced number of identified individuals the computational requirements for the target detection task (T4) 406 also decrease and therefore the processing time for the target detection task (T4) 406 decreases; thus, the scheduling state is changed.

One motivation for on-line scheduling is to gain robustness to changes in the optimal schedule with respect to a given schedule state. For example, the costs that were used to compute an optimal schedule for a particular state in the past may change as the application and the computer system evolve. Changes to the application, adding functionality to a particular task or tuning it for faster execution, will perturb the costs. Upgrading hardware or installing a new OS release can have a similar effect. In theory of course, the schedule state could be defined in such a way as to include all of these effects, but in practice this may not be possible or desirable. Essentially what this means is that the current specification of the schedule state itself may not actually encompass all of the factors that are relevant in computing an optimal schedule. For example, in a 16 Central Processing Unit ("CPU") system the number of processors might not be explicitly included in the schedule state, and the optimal schedules would then depend on the availability of all 16 CPUs. If a CPU fails in this instance, some of the schedules could become suboptimal. It is conceivable that an on-line scheduling system could adapt to this situation by discovering newly optimal schedules, for example by learning to avoid assigning any tasks to the defective CPU.

Figure 4:
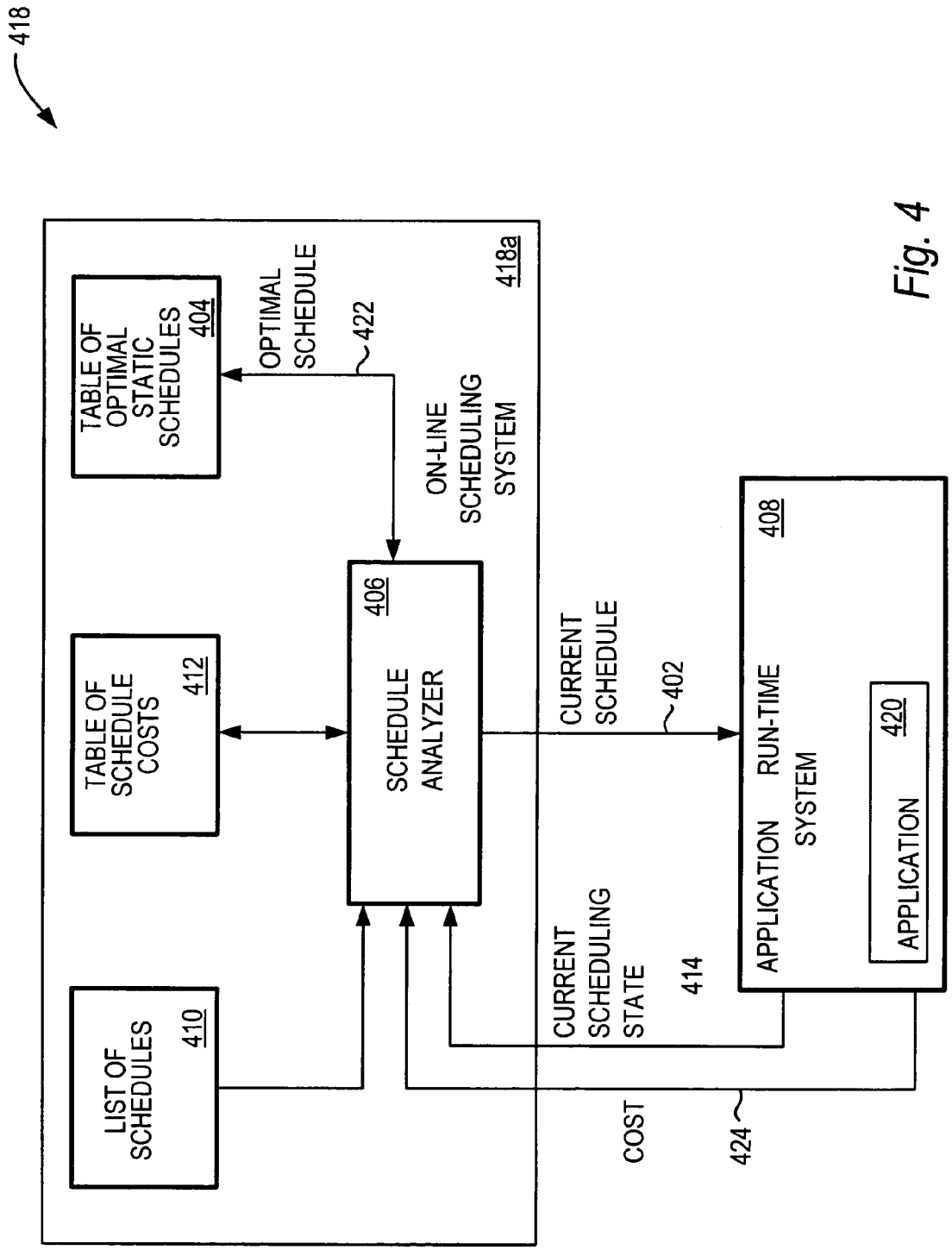
FIG. 4 is a block diagram illustrating the components of one preferred embodiment of the off-line scheduling system 118 according to the principles of the present invention.

FIG. 4 is a block diagram illustrating the components of a preferred embodiment of the scheduling system 118 according to the principles of the present invention. The on-line scheduling system 418a includes a table of optimal static schedules 404, a list of schedules 410, a table of schedule costs 412 and a schedule analyzer 406.

Before executing an application 420, the on-line scheduling system 418a selects a pre-defined static schedule for the application 420 in the application run-time system 408 dependent on the current scheduling state 414 of the application 420.

The cost motive for the application 420 involves the minimum time in which to complete one iteration of the application 420. The application 420 is a constrained dynamic application. An application exhibits constrained dynamism if its computational behavior can be modeled by a small number of scheduling states, changes in the scheduling state are infrequent, and changes in the scheduling state are detectable at run-time.

In the embodiment shown in FIG. 4, the costs of executing distinct schedules are measured on-line and used to adapt the optimal schedule 422 for each schedule state. The set of all possible schedules for tasks in the application is computed off-line and stored in the list of schedules 410. Associated with the table of optimal static schedules 404 is a table of schedule costs 412 which has one schedule cost record for each distinct schedule state. The list of schedules 410 is described later in conjunction with FIG. 5. The table of optimal schedules 404 is described later in conjunction with FIG. 6. The table of schedule costs 412 is described later in conjunction with FIG. 7.

The acceptable frequency of scheduling state changes depends on a number of factors including the execution time of an iteration, the overhead of a scheduling state change and the expected benefit of a scheduling state change. While the system remains in a particular scheduling state, the behavior of the application 420 is relatively predictable. Scheduling state changes can be unpredictable as long as they are detectable.

Off-line, before the application 420 is executed, a static schedule is determined for each scheduling state. The information needed to determine this schedule includes the scheduling state and the necessary information about the schedule. The scheduling state includes application variables, system parameters and goals (cost metrics) that may impact the schedule.

The necessary information about the application includes tasks, dependencies among the tasks, timings for each task in the scheduling state and a description of which tasks are potentially data parallel over which data structures in the application 420. An optimized schedule for each scheduling state is determined, and stored in the table of optimal static schedules 404. Any technique for determining a static schedule may be used.

In order to determine an optimal schedule 422 for a scheduling state, the ability to identify the better of two given schedules is required. The identification of the best schedule requires a cost metric. The choice of cost metric depends on a combination of application, platform and situation. For example, variables used to determine a cost metric include minimal latency, maximal work accomplished in wall clock time, maximal work in CPU time and minimal total work.

In the color tracker application, the appropriate cost metric is a combination of minimal latency per video frame and uniformity of video frames processed over time. An execution that exhibits uniformity processes frames at a reasonably regular rate. An example of a non-uniform execution is one that processes three frames in a row and then skips the next hundred frames.

In the application class, the task graphs remain fixed. However, the optimal schedule relies on the scheduling state. One aspect of the scheduling state may be dynamically changing application variables which alter the relative costs of the tasks. For example, in the task graph for the color tracker shown in FIG. 2, the time for the digitizer task (T1) 200, histogram task (T2) 202 and the change detector task (T3) 204 do not depend on the number of individuals being tracked. The time for the target detector task (T4) 206 and peak detector task (T5) 208 are both linear in the number of models but the constant factor is quite different for these two tasks. The optimal schedule may vary significantly with the number of individuals.

A list of all possible schedules is stored in the list of schedules 410 in the on-line scheduling system 418a. The optimal static schedules for each state are stored in the table of optimal static schedules 404. Upon selecting an optimal schedule 422 from the table of optimal static schedules 404, the schedule analyzer 406 provides the corresponding schedule stored in the list of schedules 410 as the current schedule 402 to the application 420.

The schedule analyzer 406 selects a pre-determined static schedule from the table of optimal static schedules 404 dependent on the current scheduling state 414. The current schedule 402 selected by the schedule analyzer 406 is implemented by the application run-time system 408.

The schedule analyzer 406 updates the table of optimal static schedules 404 as the application 420 executes. The table of optimal static schedules 404 is updated based on on-line measurements of the performance of the executing application 420 and schedule costs stored in the table of schedule costs 412. On-line learning is appropriate in situations where it may be difficult to predict the costs of distinct schedules in advance or off-line.

Referring to FIG. 2, for example, it is relatively straightforward to compute the cost of tasks such as the target detection task (T4) 206 and the peak detection task (T5) 208 as a function of the number of individuals when the system load is constant. If there is an additional schedule variable which measures system load, however, it may be nontrivial to compute in advance the cost of the target detection task (T4) 206 and the peak detection task (T5) 208 when both the number of individuals and the load variable may change. In this situation it may be better to wait until a particular state is actually attained before initiating the process of computing an optimal schedule 422 for a particular state until that state is actually attained. This strategy is effective when the schedule state space is large relative to the number of states visited by the system during run-time.

Figure 5:
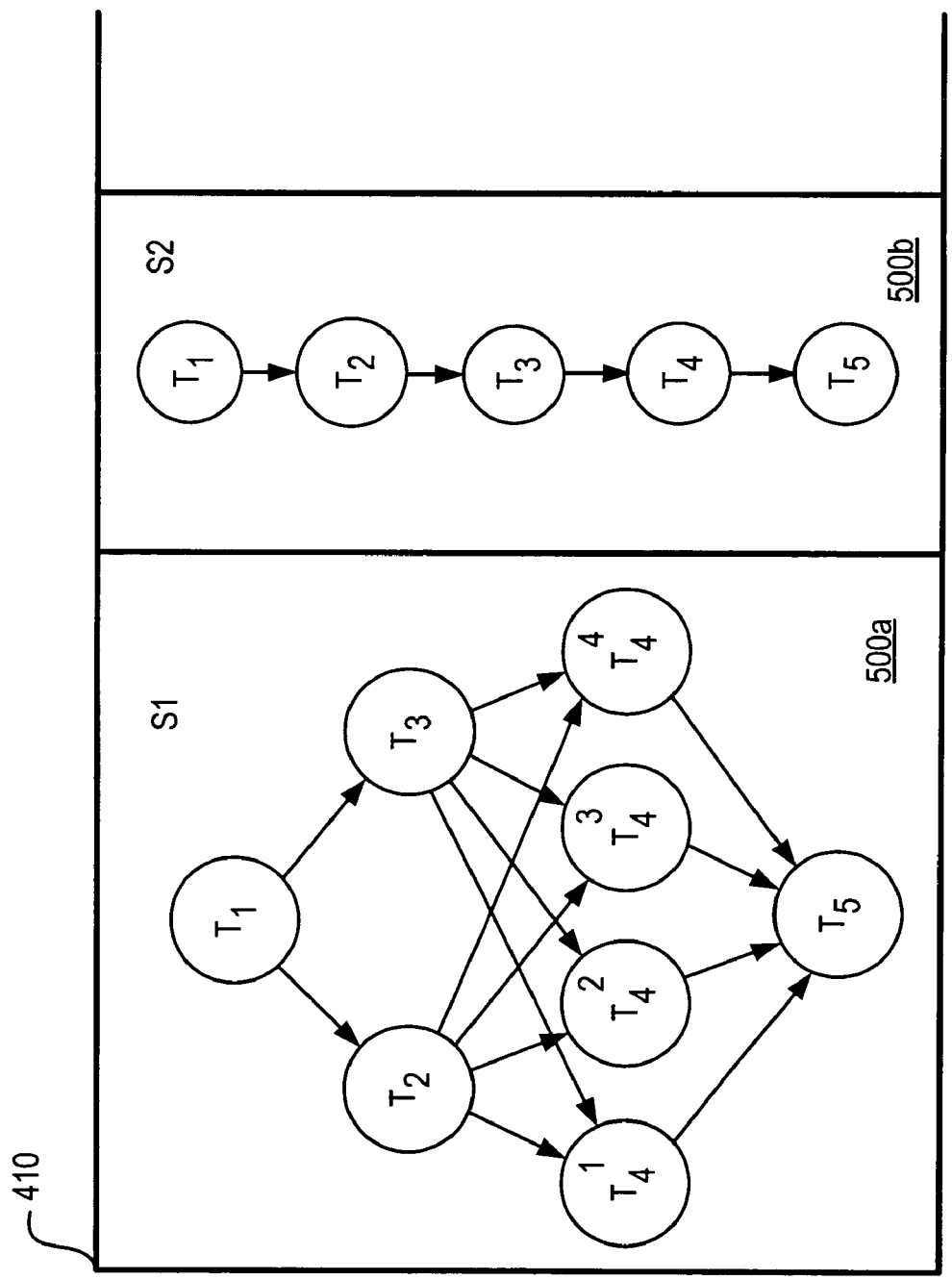
FIG. 5 is a block diagram illustrating schedules stored in the list of schedules shown in FIG. 4.

FIG. 5 is a block diagram illustrating schedules stored in the list of schedules 410 shown in FIG. 4. Two schedule entries 500*a*–*b* are shown. Schedule entry 500*a* schedules tasks T1–T5 in the color tracker application as shown in FIG. 3, to provide both data parallelism and task parallelism. Schedule entry 500*b* schedules tasks T1–T5 in the color tracker application with no data or task parallelism.

Figure 6:
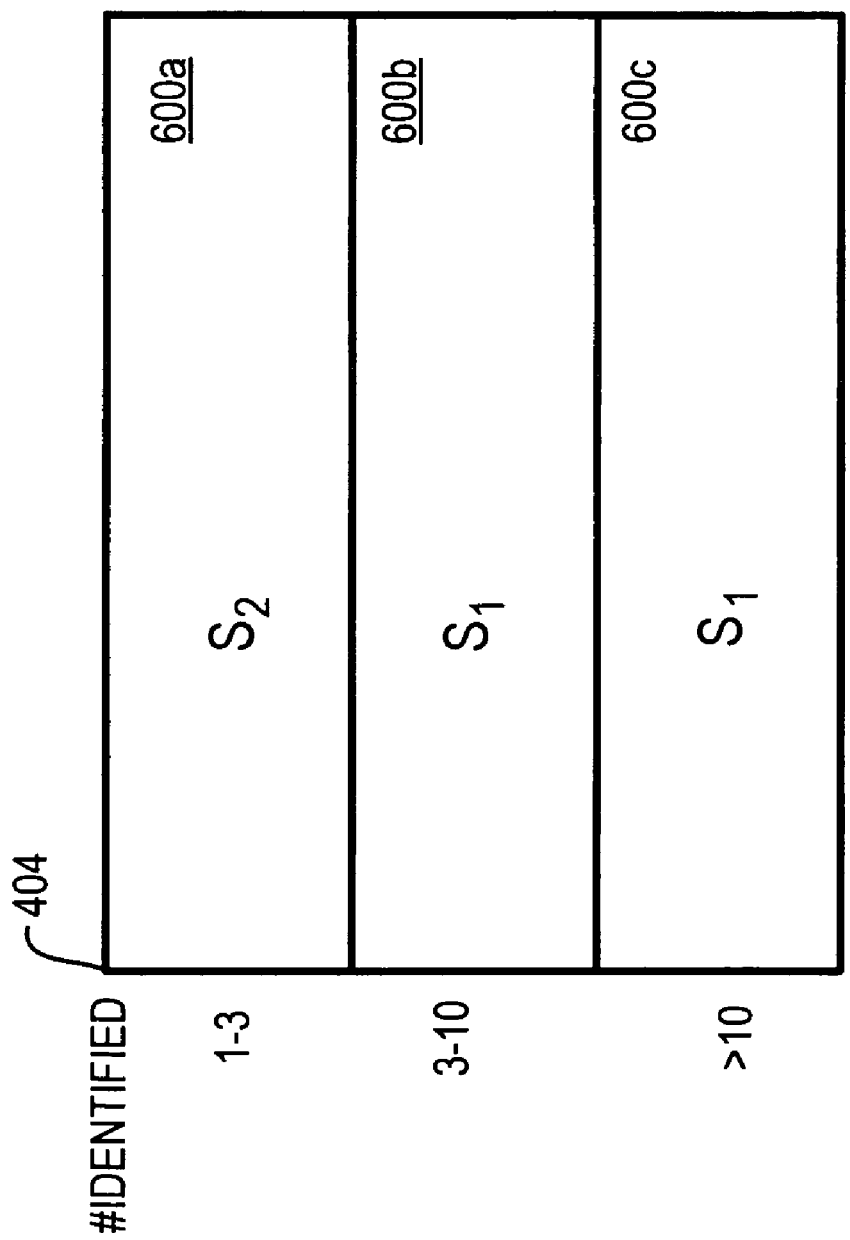
FIG. 6 is a block diagram illustrating schedule entries in the table of optimal static schedules shown in FIG. 4.

FIG. 6 is a block diagram illustrating optimal schedule entries 600*a*–*c* in the table of optimal static schedules 404 shown in FIG. 4. Each optimal schedule entry 600*a*–*c* stores a pointer to a schedule entry 500*a*–*b* in the list of schedules 410. As has already been discussed, the scheduling state of the color tracker is dependent on the number of identified individuals in front of the camera and the number of processors available in the computer system 100 for running tasks for the color tracker application. A static schedule is stored in a schedule entry 500*a*–*b* for each scheduling state in the list of schedules 410.

A pointer to schedule entry 500*b* in the list of schedules 410 is stored in optimal schedule entry 600*a* for one to three identified individuals in front of the camera and four processors available in the computer system 100. A pointer to schedule entry 500*a* in the list of schedules 410 is stored in optimal schedule entry 600*b* for three to ten individuals in front of the camera and four processors available in the computer system 100. A pointer to schedule entry 500*a* in the list of schedules 410 is stored in optimal schedule entry 600*c* for greater than ten individuals in front of the camera and four processors available in the computer system 100. Thus, a pointer to schedule entry 500*a* in the list of schedules 410 for the scheduling state with eight individuals and four processors in the color tracker described in conjunction with FIG. 3 is stored in optimal schedule entry 600*b*.

Optimal static schedule entry 600*b* is selected by the schedule analyzer 406 (FIG. 4) for the application 420 in the application run-time system 408 (FIG. 4) upon the detection of three to ten individuals in front of the camera by the application run-time system 408. The schedule analyzer 406 (FIG. 4) switches to schedule entry 500*a* stored in the list of schedules 410.

Figure 7:
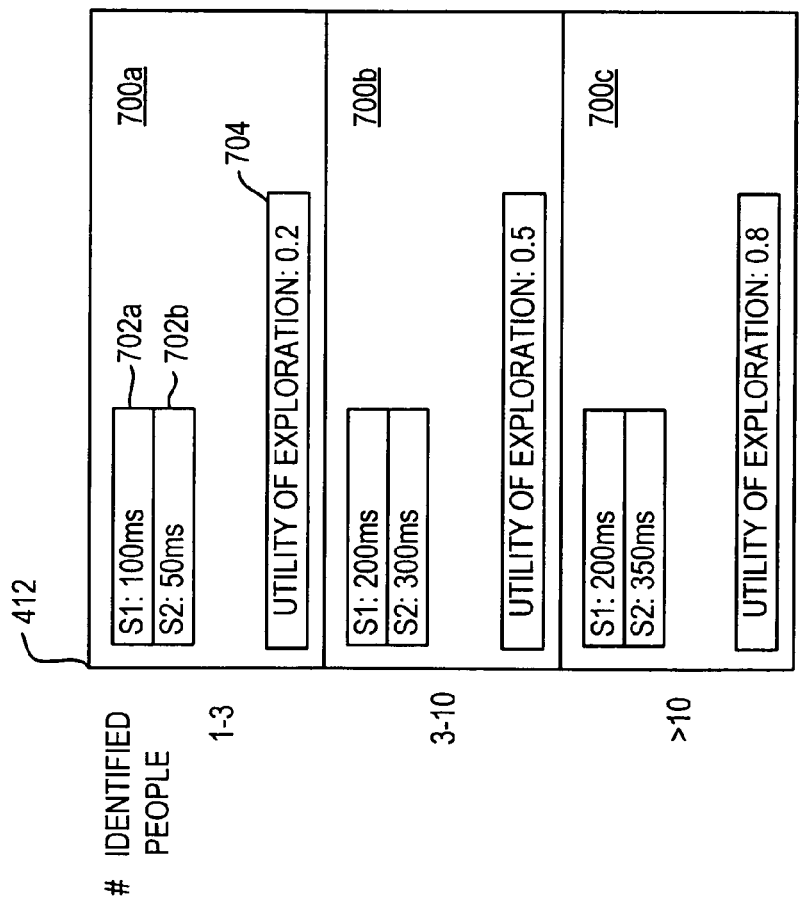
FIG. 7 is a block diagram illustrating entries in the table of schedule costs shown in FIG. 4.

FIG. 7 is a block diagram illustrating schedule cost records 700*a*–*c* in the table of schedule costs 412 shown in FIG. 4. Each schedule cost record 700*a*–*c* stores a cost estimate 702*a*–*b* for each schedule stored in the schedule entry 500*a*–*b* in the list of schedules 410.

In schedule cost record 700*a* for one to three individuals in front of the camera and four processors in the computer system 100, the schedule stored in schedule entry 500*a* takes 100 ms per iteration and the schedule stored in schedule entry 500*b* takes 50 ms per iteration. Thus, a pointer to schedule entry 500*b* (the optimal schedule) is stored in optimal schedule entry 600*a*.

Each schedule cost record 700*a*–*c* also has a field called utility of exploration 704 which stores a number that measures the likelihood that the current optimal schedule for that state can be improved upon. The utility of exploration 704 controls the amount of time the scheduling system 418*b* spends exploring new schedules for a particular schedule state 414, as opposed to simply executing the current optimal schedule. The advantage of frequently exploring new schedules is two-fold: (1) In cases where the costs of the schedules do not change over time for a particular schedule state, exploration makes it possible to identify the optimal schedule. For example, by trying all possible schedules the system can find the optimal one. (2) In cases where the costs of schedules do change over time for a fixed schedule state; that is, where there are variables that affect performance that are not part of the schedule state, frequent exploration makes it possible to react quickly to changes. For example, in the case where one processor fails on a four processor machine, frequent exploration increases the chance that a schedule which uses three processors, and is more likely to be optimal for the new situation, is tried.

The disadvantage of exploring new schedules is that the performance of the application may suffer if the schedules that are being explored turn out to be particularly bad. For example, it might be the case that the cost of one schedule for a particular state is extremely low compared to that of all of the other schedules. Once the optimal schedule has been found in this situation, time spent exploring other schedules will simply degrade application performance. In contrast, there might be a case where all or most of the schedules for a particular state give about the same performance. For instance, in the color tracker example for states in which the number of targets is 1 or 2, the computational cost will be low. Therefore, many schedules will do equally well. In this situation there is very little penalty for frequent exploration, but doing so may provide little benefit.

In general the utility of exploration 704 is determined for a particular schedule state on an application-specific basis. The basic idea is to predict how useful exploration is likely to be, based on a combination of prior knowledge and previous performance. In the most basic case, the system designer may have some intuition about the costs of various schedule states and may simply manually set the utility of exploration 704. For example, the optimal schedule for a few frequently encountered schedule states may be known and so the utility of exploration 704 may be set to zero to avoid the performance penalty associated with exploration.

The utility of exploration 704 may change over time, starting out at a high value to force exploration of various schedules, and becoming smaller over time when the utility of exploration 704 is reduced. In this application a schedule for adjusting the utility of exploration 704 over time is specified in advance.

Initially all of the entries in all of the schedule cost records 700*a*–*c* are empty. The table of optimal schedules 410 is initialized with the result of off-line computation of optimal schedules, as described in patent application Ser. No. 09/549,351 entitled "Scheduling Constrained Dynamic Applications for Parallel Constrained Dynamic Applications" by Knobe et al.

Figure 8:
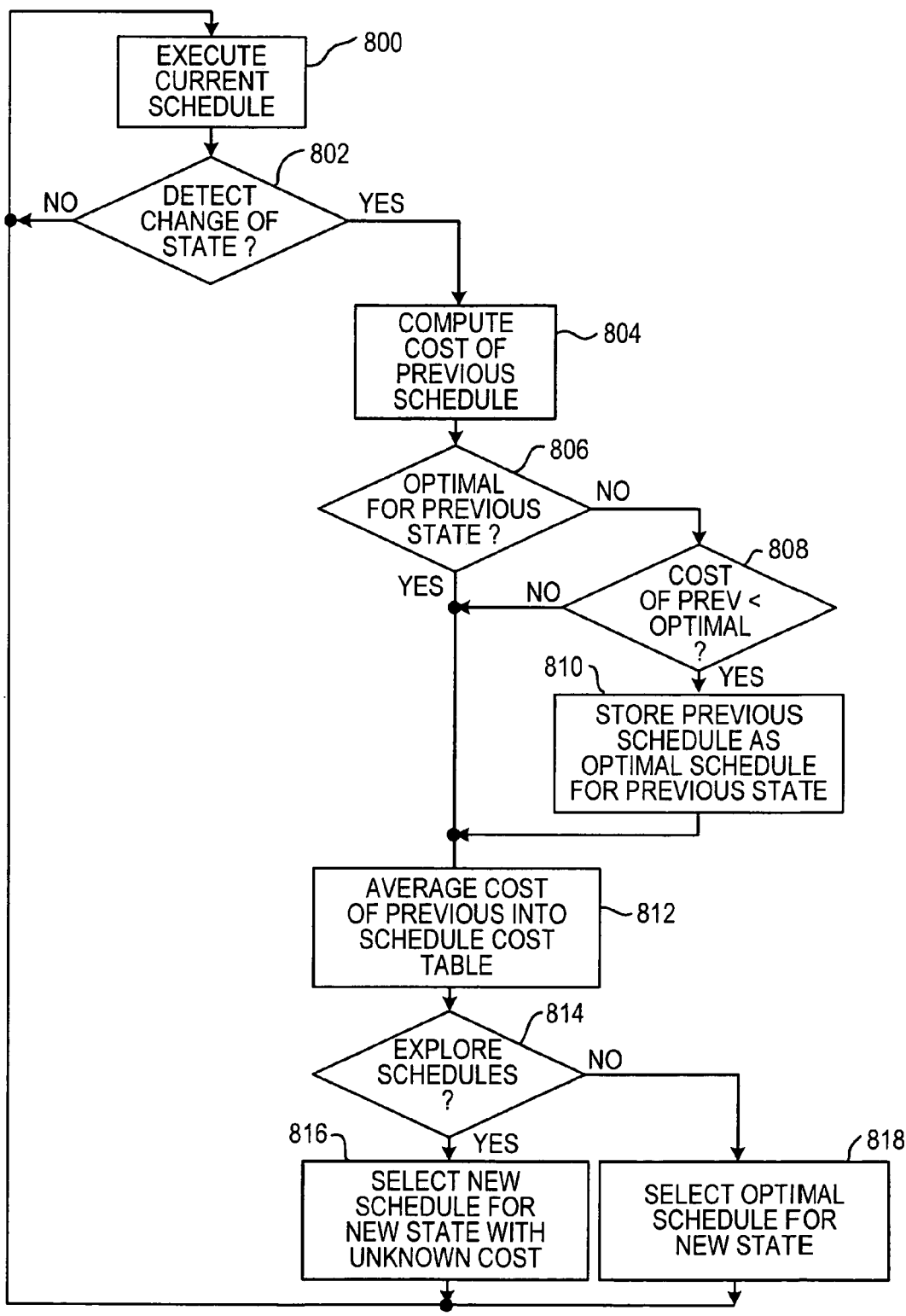
FIG. 8 is a flowgraph illustrating the steps implemented in the schedule analyzer for selecting a optimal schedule in the scheduling system shown in FIG. 4.

FIG. 8 is a flowgraph illustrating the steps implemented in the schedule analyzer for selecting a optimal schedule in the scheduling system shown in FIG. 4.

At step 800, the execution of the application 420 begins with the application 420 in a specific schedule state, executing the current schedule 402. All changes in schedule state are reflected to the schedule analyzer 406, where they generate an update event.

At step 802, upon receipt of an update event, processing continues with step 804.

At step 804, the schedule analyzer 406 computes the average cost of the previous schedule which was executing during the previous schedule state. Processing continues with step 806.

At step 806, the schedule analyzer 406 checks to see if the previous schedule is the optimal schedule for that schedule state. If it is, processing continues with step 808. If it is not, processing continues with step 812.

At step 808, the schedule analyzer 406 compares the average cost to the cost of the optimal schedule 422. If it is less, processing continues with step 810. If it is greater, processing continues with step 812.

At step 810, the schedule analyzer 406 stores the previous schedule as the optimal schedule 422 for the previous state. Processing continues with step 812.

At step 812, the schedule analyzer 406 stores the average cost into the schedule cost record 700a–c for the previous schedule state. Processing continues with step 814.

At step 814, the schedule analyzer 406 checks the utility of exploration 704 stored in the schedule cost record 700a–c in the table of schedule costs 412 for the new schedule state and determines whether to execute the current optimal schedule 422 or to try a new schedule. One possible decision rule is to have the utility of exploration 704 set to a number from 0.0 to 1.0 that defines the probability of choosing a new schedule. A random number may then be drawn from a uniform distribution and compared to a utility of exploration threshold. This policy has the effect of randomly exploring new schedules with a frequency that is inversely related to the confidence in the current optimal schedule 422. The schedule that is selected for exploration may be selected from the set of schedule cost records 700a–c that have no previously-stored cost; that is, the schedules that have not yet been explored. Alternatively it may selected randomly from the full list of schedules 410. If the utility of exploration 704 is below the threshold, processing continues with step 816. If the utility of exploration 704 is above the threshold, processing continues with step 816.

At step 816, the schedule analyzer 406 randomly selects a schedule from the list of schedules 410. Processing continues with step 800.

At step 818, the schedule analyzer 406 selects the current optimal schedule. Processing continues with step 800.

Figure 9:
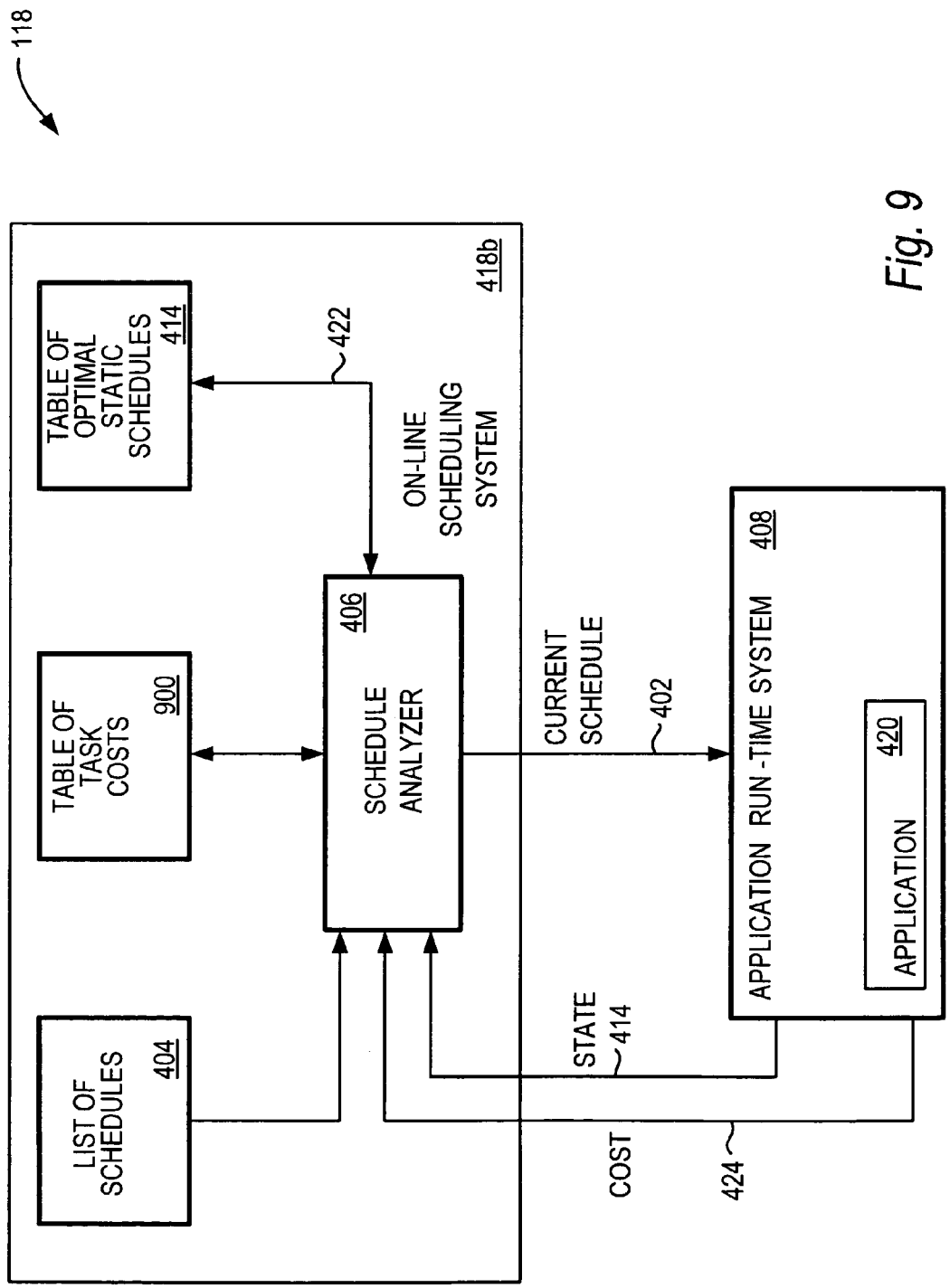
FIG. 9 is a block diagram illustrating another preferred embodiment of an on-line scheduling system according to the principles of the present invention.

FIG. 9 is a block diagram illustrating an alternative embodiment of a scheduling system 118 shown in FIG. 1 according to the principles of the present invention. The on-line scheduling system 418b evaluates cost at the task level rather than at the level of distinct schedules as described for the on-line scheduling system 418a shown in FIG. 4.

The on-line scheduling system 418b includes a table of optimal static schedules 404, a list of schedules 410, a table of task costs 900 and a schedule analyzer 406. The on-line scheduling system 418b differs from on-line scheduling system 418a described in conjunction with FIG. 4 in that the table of schedule costs 412 is replaced with a table of task costs 900.

Figure 10:
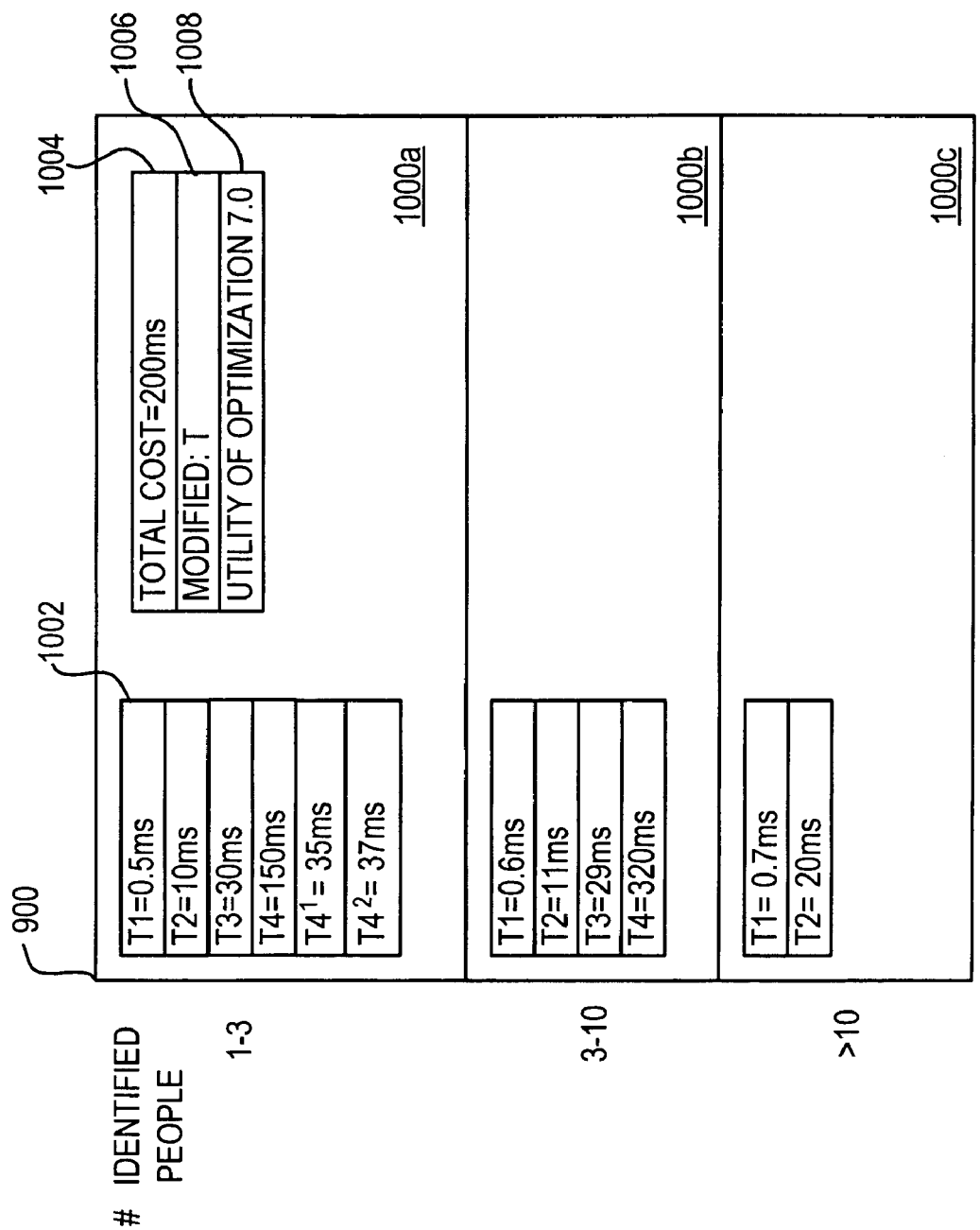
FIG. 10 is a block diagram illustrating entries in the table of task costs shown in FIG. 4.

FIG. 10 is a block diagram illustrating entries in the task cost table 900 shown in FIG. 9. The task cost table 900 has a task cost record 1000a–c for each distinct schedule state. Each task cost record 1000a–c has one task cost entry 1002 for each distinct task in the application 420. Each task cost entry 1002 stores the average cost for a task under the given schedule state. The task cost record 1000a–c also includes a modified field 1004, a utility of optimization field 1006 and a total cost field 1008. The modified field 1004 indicates whether the task cost record 100a–c has been updated. The utility of optimization field 1006 stores a measure of the perceived benefit of recomputing the optimal schedule for this set of tasks. The total cost field 1008 stores the average total cost for the application 420 using the current optimal schedule associated with the specific schedule state.

Initially the modified field 1004 is cleared, the utility of optimization field 1006 is set to one, and the total cost field 1008 is set to infinity. The set of schedule variables is predefined and the table of optimal static schedules 412 is either initialized with a set of off-line optimal schedules, or with a single fixed schedule that applies to all schedule states.

Figure 11:
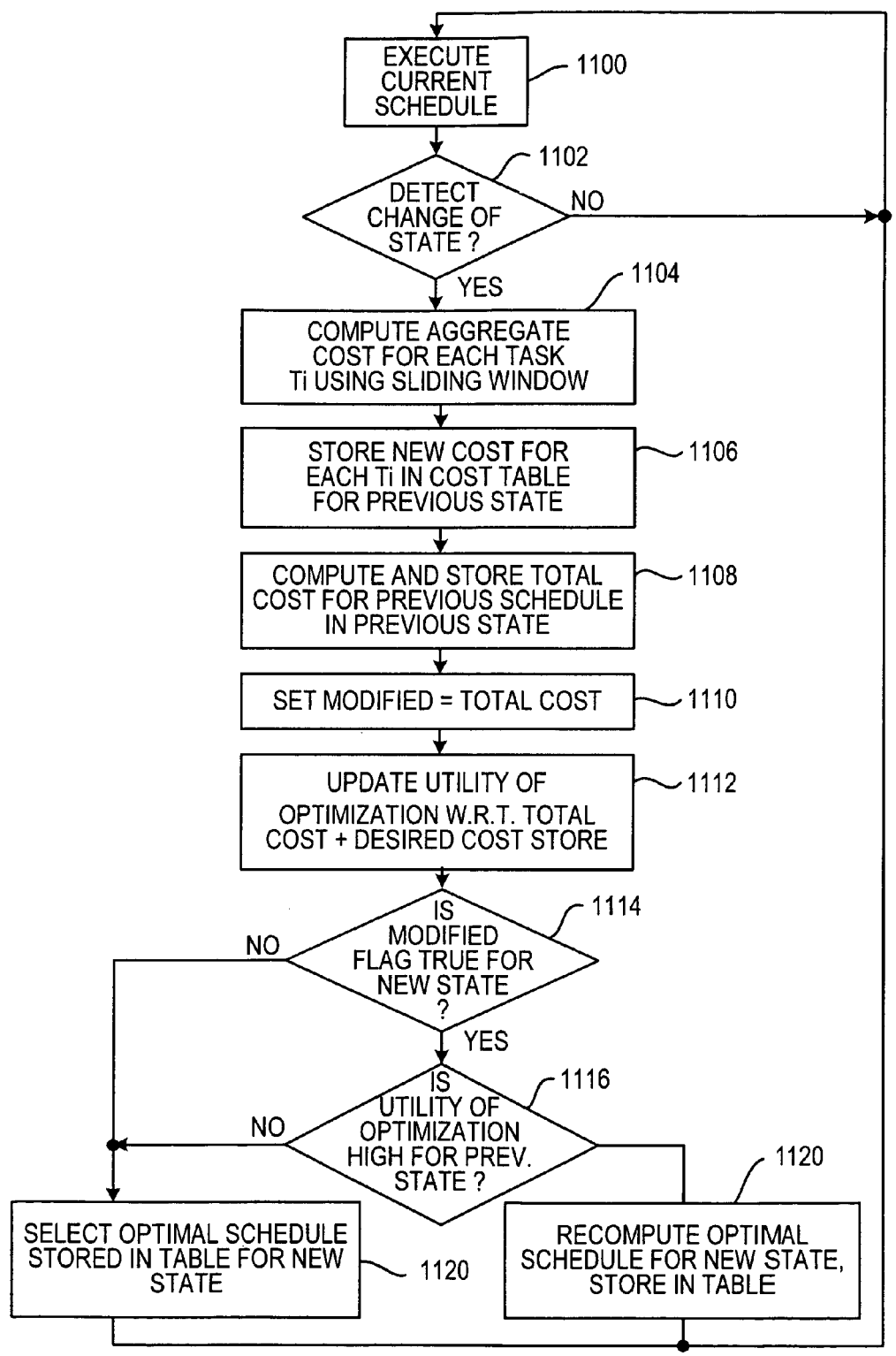
FIG. 11 is a flowgraph illustrating the steps implemented in the schedule analyzer for selecting an optimal schedule in the scheduling system shown in FIG. 9.

FIG. 11 is a flowgraph illustrating the steps implemented in the schedule analyzer 406 for selecting an optimal schedule in the on-line scheduling system 418b shown in FIG. 9.

At step 1100, the on-line scheduling system 418b forwards the current schedule 402 to the application run-time system 408.

At step 1102, the schedule analyzer 406 determines if there is a change of state. Upon receipt of an update event indicating a change of state, processing continues with step 1104. If there is no change of state, processing continues with step 1100.

At step 1104, the schedule analyzer 406 computes the cost of each task for the schedule state that was in effect prior to the schedule change. The schedule analyzer 406 uses the aggregate cost for each task over the period while the schedule was in effect to perform the update. Typically a sliding window update is performed, in which the effect of an execution period on the average is progressively discounted as time goes on. This ensures that the cost stored for each task reflects the recent performance of the system at the expense of past performance. Processing continues with step 1106.

At step 1106, the schedule analyzer 406 updates the task cost entries 1002 in the table of task costs 900 for the schedule state that was in effect prior to the schedule change. Processing continues with step 1108.

At step 1108, the schedule analyzer 406 computes the total execution time for the task and stores it in the total cost field 1004 in the task cost record 1000a–c. Processing continues with step 1110.

At step 1110, the schedule analyzer 406 updates the modified field 1006 in the task cost record 1000a–c. Processing continues with step 1112.

At step 1112, the schedule analyzer 406 updates the utility of optimization field 1008 in the task cost record 1000a–c. Processing continues with step 1114.

At step 1114, the schedule analyzer 406 checks the modified field 1106 in the task cost record 1000a–c in the table of task costs 900 corresponding to the new schedule state. If the modified field 1106 is not set, the task costs have not changed. Thus, there is nothing to be gained from re-computing the schedule and processing continues with step 1118. If the modified field 1006 is set, processing continues with step 1116.

At step 1116, the schedule analyzer 406 checks the utility of optimization field 1008 in the task cost record 1000a corresponding to the schedule state in the table of task costs 900. If the value stored in the utility of optimization field 1008 is high, processing continues with step 1120. If not, processing continues with step 1118. By performing the checks in step 1114 and 1116, the schedule analyzer 406 determines whether to recompute the optimal schedule for the new schedule state, or to use the currently specified optimal schedule.

At step 1118, the schedule analyzer 406 selects the optimal schedule stored in the table of optimal static schedules 404 for the new state. Processing continues with step 1100.

At step 1120, the optimal schedule for the new schedule state is recomputed using the task costs stored in task cost entries 1002 in the task cost record 1000a–c corresponding to the schedule state stored in the table of task costs 900. The computation of the optimal schedule can be performed as described for off-line analysis described in patent application Ser. No. 09/549,351 entitled "Scheduling Constrained Dynamic Applications for Parallel Constrained Dynamic Applications" by Knobe et al. which is incorporated herein by reference in its entirety. Processing continues with step 1100.

One exemplary technique for computing the utility is to compare the total cost of the application 1004 stored in the task cost record 1000a–c to some pre-specified minimum acceptable cost. The utility of optimization is high whenever the cost of the last execution of the schedule is outside an acceptable range.

The advantage of the on-line scheduling system 418b shown in FIG. 9 is that the on-line scheduling system 418b can adapt quickly to changes in the optimal schedule 422. Because the execution of any schedule causes individual task costs to be updated, the identification of the optimal schedule does not depend upon the execution of any particular schedule. In principle, the optimal schedule for a scheduling state can be recomputed after just one execution of any valid schedule for a given schedule state. However, this attractive property relies upon the relative consistency of task costs across schedules. Consistency means that the task costs are similar regardless of which schedule is executing. However, tasks costs may not be consistent. For example caching effects may cause a variation in the cost of one task depending upon which additional tasks are executing on a multiprocessor. Failure to model this interaction may result in the choice of a suboptimal schedule.

The advantage of the on-line scheduling system 418a shown in FIG. 4, which updates the costs of distinct schedules, is that it does not depend upon the consistency of task costs. Any interaction between tasks is captured automatically in the total cost of the schedule. This provides greater accuracy in complex situations. However, the price for this accuracy is that all possible schedules must be explored individually to determine the optimal choice.

It is clearly possible to combine aspects of on-line scheduling system 418a described in conjunction with FIG. 4 and on-line scheduling system 418b described in conjunction with FIG. 9 to produce a hybrid on-line scheduling system 418c by combining the table of schedule costs 412 shown in FIG. 4 and the table of task costs 900 shown in FIG. 9.

Figure 12:
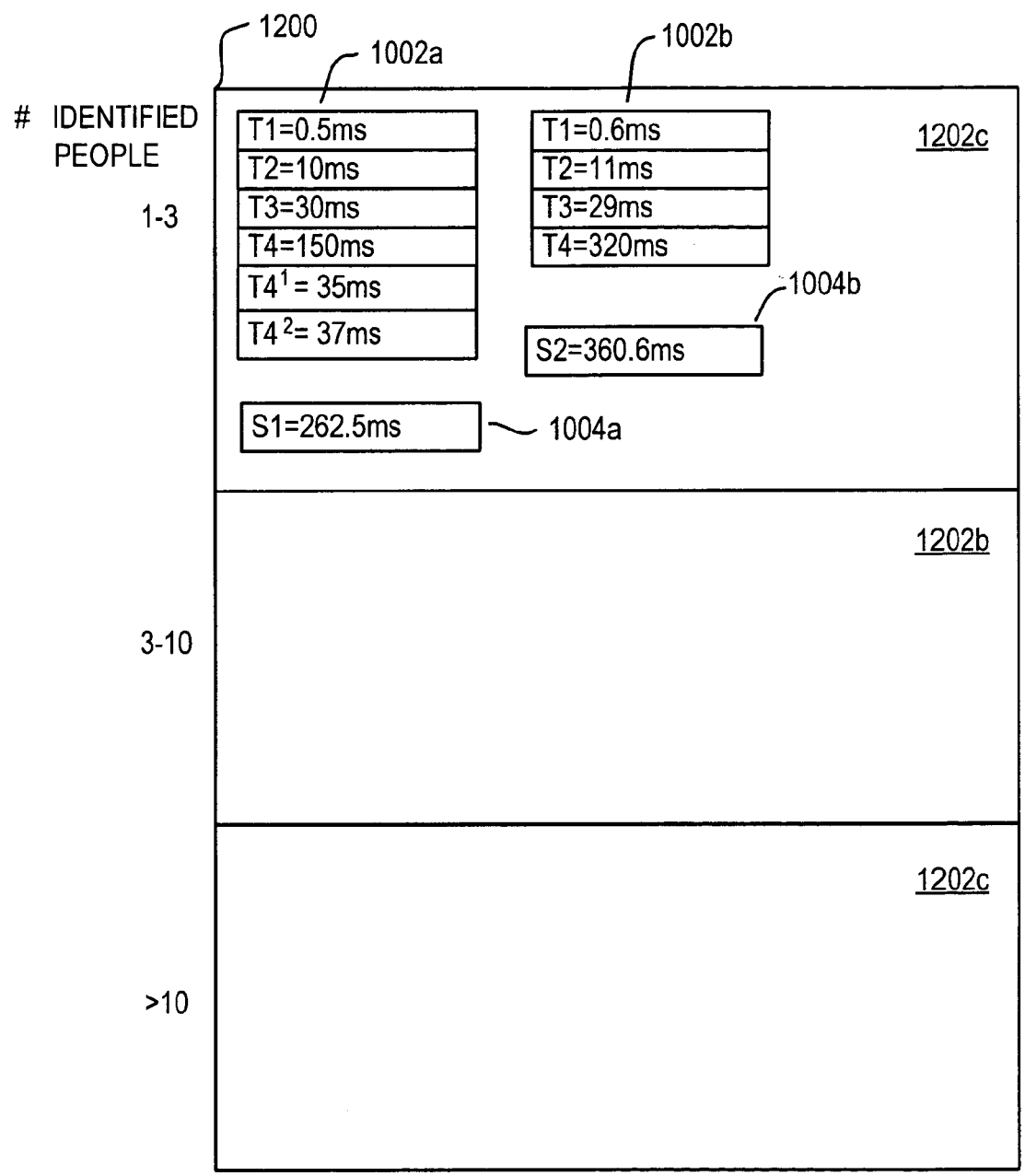
FIG. 12 is a block diagram illustrating entries in a combined table of task costs and schedule costs.

FIG. 12 is a block diagram illustrating entries in a combined table of task costs and schedule costs 1200. Task-based adaptation is used to rank the possible distinct schedules for a given schedule state for further exploration. The updated task costs are used to compute a predicted total cost for each possible schedule 1204a–b. The predicated cost for each schedule 1204a–b is stored in a schedule state entry 1202a–c in the combined table of task costs and schedule costs 1200.

The accuracy of the predicted cost for each schedule 1204a–b depends upon the consistency of the task costs across schedules. These predictions are used to rank the possible schedules for further exploration using the technique described in conjunction with FIG. 8 for on-line scheduler 418a shown in FIG. 4. By exploring distinct schedules in the order of increasing predicted cost, it is possible to obtain an optimal schedule 422 more quickly and avoid exploring schedules that are clearly suboptimal.

The combined table of task costs and schedule costs 1200 shown in FIG. 12 where old schedule execution costs are progressively discounted with time giving more importance to recent schedule execution costs is a specific instance of a more general concept called intra-state variables. State variables distinguish between states, and there is some variance allowed within a state. Intra-state variables are those variables that account for this intra-state variance. Intra-state variables such as, time can be used to determine how an execution of the schedule is used to update cost estimates.

The preferred embodiments of the on-line scheduling system 418a–b and the hybrid on-line scheduling system 418c assume that all decisions about computing and selecting optimal schedules occur at the boundary points where there is a change in the schedule state. If the schedule state changes very infrequently in a particular application, it may be advantageous to execute the schedule analyzer 406 at some regular interval within a period of constant schedule state, in order to benefit more quickly from measurements of task and schedule costs.

As described above the state space is fixed. The focus of the learning is on the optimal schedule for each state in the fixed space. However, it is also possible to apply learning to adjusting the state space itself. As a simple example, the system may merge adjacent states along some axis if the variance along that axis is below some threshold. Similarly it may breakup a state along some axis if the variance along that axis is above some threshold.

As described above the learning occurs in the presence of the user who may sense the impact of an exploratory, potentially slower than necessary schedule. Keeping within the realm of on-line learning, there are several other options. For example, one may use idle time or other processors for exploration. In these cases the user is always presented with schedule assumed to be the best at the time.

Figure 13:
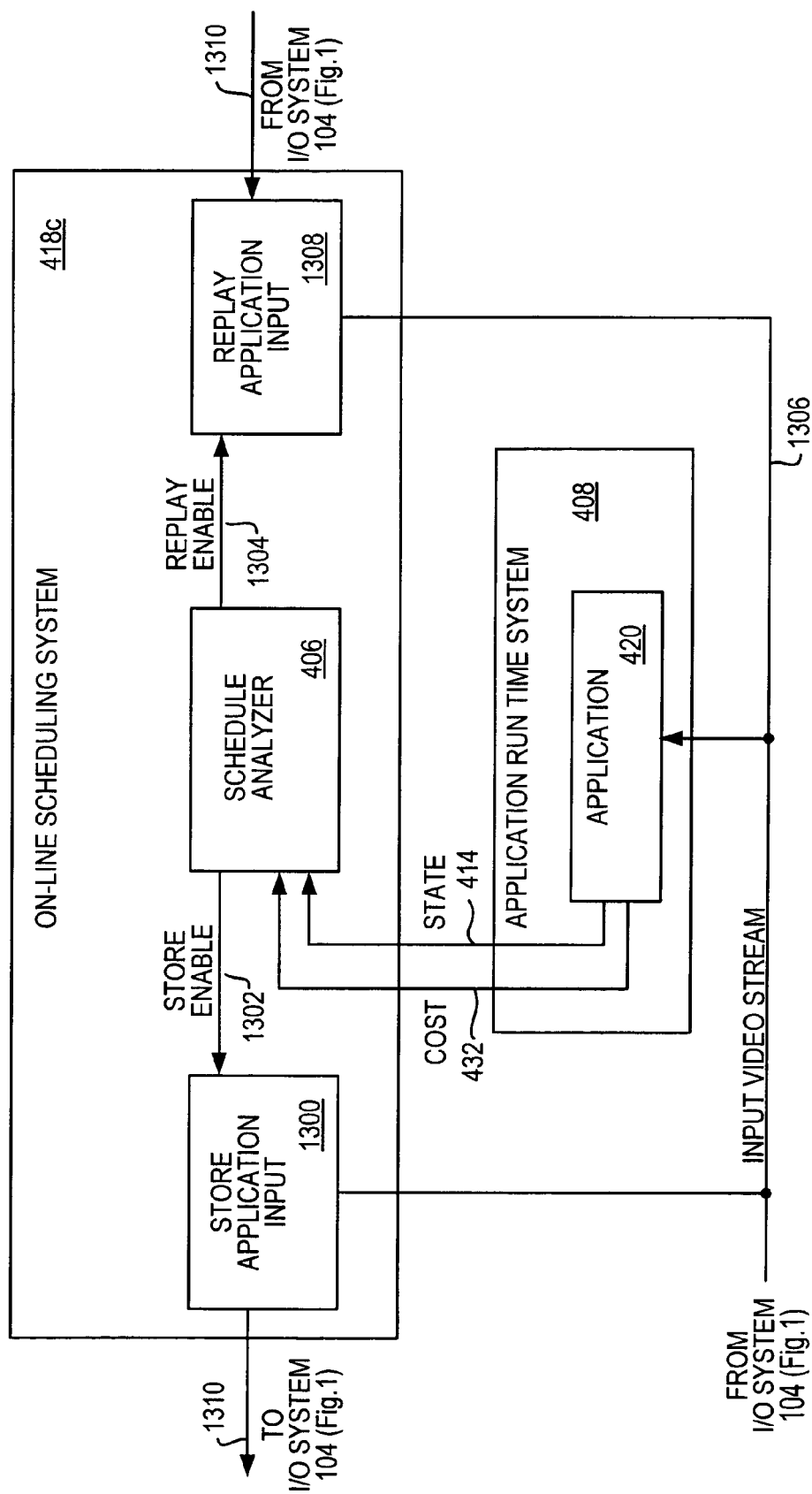
FIG. 13 is a block diagram of an on-line scheduling system for exploring schedules during the dormant period in an application.

FIG. 13 is a block diagram of an on-line scheduling system 418c for exploring schedules during the idle time in an application 420.

There is one particular variant of the use of idle time which is very useful in certain situations. Suppose that the application in question need only be executed a certain fraction of the total time in a 24 hour period. For example, the application may be an information kiosk in a public space such as shopping mall. The kiosk is active during the day but after the mall closes, the kiosk is dormant until the following morning. In this situation, the run-time system can save a representative subset of the inputs that the application received during the active period, and replay those inputs during the dormant period so that the space of possible schedules is systematically explored.

Referring to FIG. 13, if the current scheduling state 414 includes the number of kiosk customers, a store application input thread 1300 saves a complete set of application inputs 1306 received on the input video stream 1306 from a camera attached to the I/O system 104 (FIG. 1) in parallel with the execution of the application. The schedule analyzer 406 requests that the store application input thread 1300 store the data through store enable command 1302. The I/O system 104 stores the input video stream 1306 on an external storage device 116 (FIG. 1). During the dormant period, the schedule analyzer 406 requests that the replay application thread 1308 provide the stored input video stream 1306 to the application 420 through a replay enable 1304 command. The I/O system 104 reads the stored input video stream 1306 from the external storage device 116 and forwards the input video stream 1306 to the replay application input thread 1306. The replay application input thread 1308 forwards the stored input video stream 1306 to the application 420. Thus, the performance of the kiosk under different schedule states is simulated by supplying the stored input video stream 1306 to the application 420. By simulating the performance of the application 420 under controlled schedule states, the schedule analyzer 406 can systematically search for the optimal schedule.

The advantage of this embodiment over the embodiments described in conjunction with FIGS. 4, 7 and 12 is that the cost of exploration does not have an impact on the utility of the application 420 to its users. Thus, if the exploration of a particular schedule has a negative impact on kiosk performance, it is not visible to the kiosk's users if it occurs during a dormant period. In the case of the individual tracking subsystem in the kiosk, caching a single image for each number of individuals in the set of application inputs 1302 results in useful simulation data for the application 429.

This method can be executed on a subset of processors shown in FIG. 1 using a copy of the application 420 with the stored input video stream 1306. Thus learning can proceed concurrently with the on-line execution of the application 420. If this concurrent learning executes on processors in excess of the demands of the application 420, the learning does not negatively impact the application's performance. The output of the concurrent learning application is discarded. However, changes in the optimized schedules are immediately reflected to the on-line scheduling system 418c for use in the next schedule change of the application 420.

Figure 14:
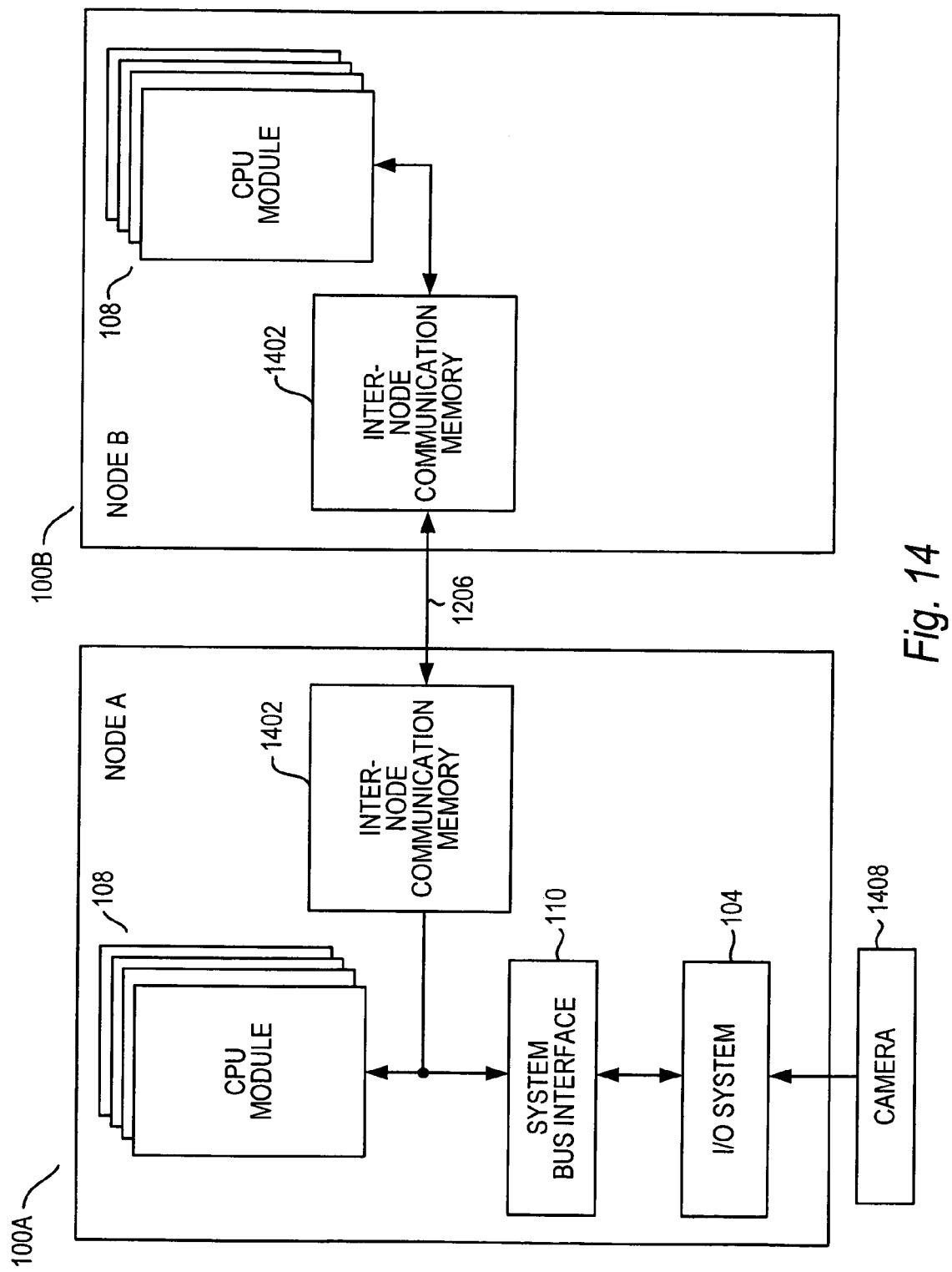
FIG. 14 is a block diagram of a cluster of computer systems in which the present invention may be used.

FIG. 14 is a block diagram of a cluster of computer systems in which the present invention may be used. The cluster of computer systems 1400 as shown includes two nodes, node_A 100A and node_B 100B. The cluster of computer systems 1400 is not limited to two nodes, it may have more than two nodes. Each of the nodes is a computer system 100 as described in conjunction with FIG. 1. The nodes 100A, 100B communicate through a communications link 1406 connecting inter-node communication memory 1402 provided in each of the nodes 100A, 100B.

A camera 1408 is connected to the I/O system 104 in node_A 100A. The tasks for the color tracker application may be scheduled on any of the processors on CPU modules 108 in node_A 100A or node_B 100B dependent on the static schedule stored in the system scheduler in one of the nodes 100A, 100B.

The scheduling system 118 shown in FIG. 1 is not limited to scheduling tasks for a color tracker, it can be used to schedule tasks in any application in this class of applications. For example, application programs involved in real-time processing and generation of multimedia data, or any application program involving real-time processing of streams of data, having large computational requirements. Other examples include, applications in surveillance, autonomous agents, and intelligent vehicles and rooms.

It will be apparent to those of ordinary skill in the art that methods involved in the present system for extending an addressable range of memory may be embodied in a computer program product that includes a computer usable medium. For example, such a computer storage medium can include a readable memory device, such as a hard drive device, a CD-ROM, a DVD-ROM or a computer diskette, having computer readable program code segments stored thereon. The computer readable medium can also include a communications or transmission medium, such as a bus or communications link, either wired, optical or wireless having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented on-line scheduling method for scheduling application program tasks, comprising:
   defining static schedules for an application program which is expressible by a task graph, each static schedule including an assignment of tasks in the application program to processors, tasks and task dependencies being determined from the task graph, the task graph being fixed but optimal schedule depending on values of scheduling variables;
   determining cost of the static schedules based on performance of the application program during run time;
   detecting, at run time, dynamic change in value of at least one scheduling variable in the application program or an environment of the application program, the dejected dynamic change in value of the at least one scheduling variable altering costs of the static schedules; and
   designating a static schedule with a lowest cost as an optimal schedule for a scheduling state defined by value of the at least one scheduling variable.

2. The method of claim 1, further comprising:
   storing a set of all possible static schedules associated with each scheduling state; and
   upon a change of state, selecting the optimal schedule associated with the scheduling state.

3. The method of claim 1, wherein the performance of the application program is based on time to complete one iteration of the application program.

4. The method of claim 1, further comprising:
   maintaining a task execution cost for each task in the application program for each scheduling state.

5. The method of claim 4, wherein an optimal static schedule associated with a new scheduling state is computed using stored task execution costs.

6. The method of claim 5, wherein the cost of an individual task is updated using stored task execution costs with recent task execution costs having more importance.

7. The method of claim 5, wherein the cost of a schedule is updated using stored schedule execution costs with recent schedule execution costs having more importance.

8. The method of claim 1, wherein determining cost of the static schedules further comprises:
   storing application program input data received during an active period in the application program; and
   exploring optimal schedules while replaying stored input data during an idle period in the application program.

9. The method of claim 1, wherein the step of determining cost of the static schedules further comprises:
   concurrently executing a copy of the application program with identical input data on a second processor, where the second processor is not executing the application program.

10. An on-line scheduling system for scheduling application programs stored in a computer comprising:
    static schedules for an application program which is expressible by a task graph, each static schedule including an assignment of tasks from the application program to processors, tasks and task dependencies being determined from the task graph, the task graph being fixed but optimal schedule depending on values of scheduling variables; and a schedule analyzer which:
  determines cost of the static schedules based on performance of the application program during run time;
  detects, at run time, dynamic change in value of at least one scheduling variable in the application program or an environment of the application program, the detected dynamic change in value of the at least one scheduling variable altering costs of the static schedules; and
  designates a static schedule with a lowest cost as an optimal schedule for a scheduling state defined by value of the at least one scheduling variable.

11. The system of claim 10 further comprising:
  a list of schedule costs which stores the optimal schedule associated with each schedule state wherein upon a change of state the schedule analyzer selects the optimal schedule corresponding to the schedule state.

12. The system of claim 10 further comprising:
  a task execution table which stores a task execution cost for each task in the application program for each scheduling state.

13. The system of claim 12, wherein the schedule analyzer computes an optimal static schedule associated with a new scheduling state using stored task execution costs.

14. The system of claim 10 further comprising:
  memory which stores application program input data received during an active period in the application program, stored application program input data allowing the schedule analyzer to explore optimal schedules while replaying the application program input data during an idle period in the application program.

15. The system of claim 10, wherein the schedule analyzer provides a copy of the application program and the stored application program input data for concurrent execution on a second processor, where the second processor is not executing the application program.

16. The system of claim 10, wherein a change in optimized schedules is immediately reflected to the schedule analyzer for use in a next schedule change of the application program.

17. An on-line scheduling system for scheduling application programs stored in a computer comprising:
  static schedules for an application program which is expressible by a task graph, each static schedule including an assignment of tasks to processors, tasks and task dependencies being determined from the task graph, the task graph being fixed but optimal schedule depending on values of scheduling variables;
  means for determining cost of the static schedules based on performance of the application program during run time;
  means for detecting, at run time, dynamic change in value of at least one scheduling variable in the application program or an environment of the application program, the detected dynamic change in value of the at least one scheduling variable altering costs of the static schedules; and
  means for designating a static schedule with a lowest cost as an optimal schedule for a scheduling state defined by value of the at least one scheduling variable.

18. A computer program product for system on-line scheduling, the computer program product comprising a computer storage medium having computer readable program code thereon to be executed by a computer, including program code which:
  defines static schedules for an application program which is expressible by a task graph, each static schedule including an assignment of tasks in the application program to processors, tasks and task dependencies being determined from the task graph, the task graph being fixed but optimal schedule depending on values of scheduling variables;
  determines cost of the static schedules based on performance of the application program during run time;
  detects, at run time, dynamic change in value of at least one scheduling variable in the application program or an environment of the application program, the detected dynamic change in value of the at least one scheduling variable altering costs of the static schedules; and
  designates a static schedule with a lowest cost as an optimal schedule for a scheduling state defined by value of the at least one scheduling variable.

19. A computer system comprising:
  a central processing unit connected to a memory system by a system bus;
  an I/O system, connected to the system bus by a bus interface; and
  a scheduling system routine located in the memory system which includes:
  static schedules for an application program which is expressible by a task graph, each static schedule including an assignment of tasks from the application program to processors, tasks and task dependencies being determined from the task graph, the task graph being fixed but optimal schedule depending on values of scheduling variables; and.
  a schedule analyzer which:
  determines cost of the static schedules based on performance of the application program during run time;
  detects, at run time, dynamic change in value of at least one scheduling variable in the application program or an environment of the application program, the detected dynamic change in value of the at least one scheduling variable altering costs of the static schedules; and
  designates a static schedule with a lowest cost as an optimal schedule for a scheduling state defined by value of the at least one scheduling variable.

20. The computer system of claim 19 wherein the dynamic change in value of the at least one scheduling variable alters relative cost of tasks in the static schedules.

* * * * *